US010440624B2

(12) United States Patent
Zhao et al.

(10) Patent No.: US 10,440,624 B2
(45) Date of Patent: *Oct. 8, 2019

(54) DATA TRANSMISSION CONTROL METHOD, APPARATUS AND SYSTEM

(71) Applicant: Huawei Technologies Co., Ltd., Shenzhen, Guangdong (CN)

(72) Inventors: Chao Zhao, Shenzhen (CN); Bo Lin, Beijing (CN); Tao Zhang, Beijing (CN)

(73) Assignee: Huawei Technologies Co. Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/909,690

(22) Filed: Mar. 1, 2018

(65) Prior Publication Data
US 2018/0192343 A1 Jul. 5, 2018

Related U.S. Application Data

(63) Continuation of application No. 14/725,091, filed on May 29, 2015, now Pat. No. 9,949,194, which is a (Continued)

(51) Int. Cl.
H04W 4/00 (2018.01)
H04W 36/22 (2009.01)
(Continued)

(52) U.S. Cl.
CPC .......... H04W 36/22 (2013.01); H04W 24/10 (2013.01); H04W 28/065 (2013.01);
(Continued)

(58) Field of Classification Search
None
See application file for complete search history.

(56) References Cited

U.S. PATENT DOCUMENTS 8,149,757 B2 * 4/2012 Zheng ............... H04B 7/15557 370/279
8,270,361 B2 9/2012 Yi et al.
(Continued)

FOREIGN PATENT DOCUMENTS

CN 101400156 A 4/2009
CN 101621832 A 1/2010
(Continued)

OTHER PUBLICATIONS

"3rd Generation Partnership Project; Technical Specification Group Radio Access Network; Evolved Universal Terrestrial Radio Access (E-UTRA); Radio Link Control (RLC) protocol specification (Release 11)"; 3GPP TS 36.322 V11.0.0; Sep. 2012; 39 pages.
(Continued)

Primary Examiner — Willie J Daniel, Jr.
(74) Attorney, Agent, or Firm — Leydig, Voit & Mayer, Ltd.

(57) ABSTRACT

A data transmission control method, apparatus and system are provided. A radio communication node receives a data packet sent by a base station, where the data packet is generated by using a Packet Data Convergence Protocol protocol data unit (PDCP PDU) of the base station. The radio communication node acquires the PDCP PDU, which is used as a Radio Link Control service data unit (RLC SDU), in the data packet. The radio communication node sends data generated by using the RLC SDU to a user equipment, where a user plane connection is established between the radio communication node and the user equipment, and a control plane connection is established between the base station and the user equipment.

16 Claims, 10 Drawing Sheets

Related U.S. Application Data continuation of application No. PCT/CN2012/085584, filed on Nov. 29, 2012.

(51) Int. Cl.

| | | |
|---|---|---|
| *H04W 72/04* | (2009.01) | |
| *H04W 28/06* | (2009.01) | |
| *H04W 24/10* | (2009.01) | |
| *H04W 36/00* | (2009.01) | |
| *H04L 5/00* | (2006.01) | |
| *H04W 88/08* | (2009.01) | |
| *H04W 76/11* | (2018.01) | |

(52) U.S. Cl.
CPC ... *H04W 36/0005* (2013.01); *H04W 72/0406* (2013.01); *H04L 5/0035* (2013.01); *H04W 76/11* (2018.02); *H04W 88/08* (2013.01)

(56) References Cited

U.S. PATENT DOCUMENTS

| | | | |
|---|---|---|---|
| 8,855,047 B2 * | 10/2014 | Sammour | H04L 1/1874 370/328 |
| 9,654,256 B2 | 5/2017 | Chun | |
| 9,949,194 B2 * | 4/2018 | Zhao | H04W 72/0406 |
| 2008/0247349 A1 | 10/2008 | Hsieh et al. | |
| 2009/0318152 A1 | 12/2009 | Maheshwari | |
| 2010/0189059 A1 | 7/2010 | Yang | |
| 2010/0302999 A1 | 12/2010 | Hui et al. | |
| 2012/0033641 A1 | 2/2012 | Huang | |
| 2012/0039260 A1 | 2/2012 | Song et al. | |
| 2012/0140704 A1 | 6/2012 | Zhao et al. | |
| 2015/0023370 A1 | 1/2015 | Sammour et al. | |

FOREIGN PATENT DOCUMENTS

| | | |
|---|---|---|
| CN | 101932004 A | 12/2010 |
| CN | 102090087 A | 6/2011 |
| CN | 102098725 A | 6/2011 |
| CN | 102378109 A | 3/2012 |
| CN | 102405610 A | 4/2012 |
| EP | 0 889 608 A2 | 1/1999 |
| EP | 1 827 034 A1 | 8/2007 |
| EP | 2073424 A1 | 6/2009 |
| EP | 2 509 386 A1 | 10/2012 |
| KR | 20100066575 A | 6/2010 |
| KR | 101161605 B1 | 7/2012 |
| WO | WO 02/05573 A2 | 1/2002 |
| WO | WO 03/021871 A2 | 3/2003 |
| WO | 2007083219 A2 | 7/2007 |
| WO | WO 2007/086842 A1 | 8/2007 |
| WO | WO 2008/017693 A1 | 2/2008 |
| WO | 2009045945 A2 | 4/2009 |
| WO | WO 2009/075549 A1 | 6/2009 |
| WO | WO 2012/146076 A1 | 11/2012 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; 3GPP TS 36.322 V11.3.0; Sep. 2012; 205 pages.

\* cited by examiner

DATA TRANSMISSION CONTROL METHOD, APPARATUS AND SYSTEM

CROSS-REFERENCE TO RELATED APPLICATIONS

This application is a continuation of U.S. patent application Ser. No. 14/725,091 filed on May 29, 2015, which is a continuation of International Application No. PCT/CN2012/085584 filed on Nov. 29, 2012, all of the afore-mentioned patent applications are hereby incorporated by reference in their entireties.

TECHNICAL FIELD

The present application relates to the communications field, and in particular, to a data transmission control method, apparatus and system.

BACKGROUND

In recent years, with rapid development of mobile communications technologies, the number of users increases sharply and user equipment (UEs) have growing requirements on networks, which places a huge service burden on network base stations. Especially in a hotspot area and during indoor communications, operators need to continuously maintain a base station having a larger coverage area and higher transmit power, so as to ensure that services required by all UEs can be smoothly carried out and operated.

A heterogeneous network is put forward to meet requirements of a hotspot area and indoor communications in an Long Term Evolution-Advanced (LTE-Advanced) communications system, and a main implementation manner is introducing some base stations having smaller coverage areas and lower transmit power to a traditional network structure to form small cells, and deploying the base stations in service hotspot areas or coverage holes. In this way, when a UE moves to these areas, services can be handed over to these small cells, so as to achieve objectives such as service offloading and coverage hole filling.

In an existing coordinated multi-point (CoMP) technology, remote radio heads (RRHs) may be deployed in a coverage area of a base station, a backhaul manner of an optical fiber connection is used, and the base station schedules UEs in a centralized manner, so that multiple transmission points, such as the base station and one or more of the RRHs, coordinate to transmit data to the UEs to increase a throughput. However, deployment of a backhaul network by using an optical fiber has a high cost, which is not beneficial to operation and use, and therefore it is necessary to explore a new network architecture that can effectively increase a throughput of UEs when a non-optical fiber backhaul network is used.

SUMMARY

The present disclosure provides a data transmission control method, apparatus and system, which can ensure interlayer interaction between a Packet Data Convergence Protocol layer and a Radio Link Control layer of different apparatuses, and further satisfy data transmission requirements, so as to improve a throughput of a UE.

According to a first aspect, a data transmission control method is provided. The method includes:

receiving, by a radio communication node, a data packet sent by a base station, where the data packet is generated by using a Packet Data Convergence Protocol protocol data unit (PDCP PDU) of the base station;

acquiring, by the radio communication node, the PDCP PDU, which is used as a Radio Link Control service data unit (RLC SDU), in the data packet; and sending, by the radio communication node, data generated by using the RLC SDU to a user equipment, where a user plane connection is established between the radio communication node and the user equipment, and a control plane connection is established between the base station and the user equipment.

According to first aspect, in a first possible implementation manner, the method further includes:

starting, by the radio communication node, a first timer, where a first timer length of the first timer is sent by the base station or operation, administration and maintenance OAM.

With reference to the first aspect and the first possible implementation manner, in a second possible implementation manner, the method further includes:

if the radio communication node does not receive a second status report sent by the user equipment when the first timer expires, sending, by the radio communication node, a first status report to the base station, where the first status report indicates that the RLC SDU is not successfully sent, and the second status report is used to indicate whether the user equipment successfully receives the data generated by using the RLC SDU; or before the first timer expires, receiving, by the radio communication node, a second status report sent by the user equipment, where the second status report is used to indicate whether the user equipment successfully receives the data generated by using the RLC SDU, and if the second status report indicates that the user equipment does not successfully receive the data generated by using the RLC SDU, sending, by the radio communication node, a first status report to the base station, where the first status report indicates that the RLC SDU is not successfully sent, or if the second status report indicates that the user equipment successfully receives the data generated by using the RLC SDU, skipping sending, by the radio communication node, a first status report to the base station.

According to the first aspect, in a third possible implementation manner, the method further includes:

receiving, by the radio communication node, a second status report sent by the user equipment, where the second status report is used to indicate whether the user equipment successfully receives the data generated by using the RLC SDU; and sending a first status report to the base station, where the first status report is used to indicate whether the PDCP PDU is successfully sent, where: if the second status report indicates that the user equipment successfully receives the data generated by using the RLC SDU, the first status report indicates that the PDCP PDU is successfully sent; if the second status report indicates that the user equipment does not successfully receive the data generated by using the RLC SDU, the first status report indicates that the PDCP PDU is not successfully sent.

According to the first aspect, in a fourth possible implementation manner, the method further includes:

receiving a discard message sent by the base station, where the discard message instructs to discard the RLC SDU corresponding to the PDCP PDU; and discarding the RLC SDU according to the received discard message.

According to a second aspect, a data transmission control method is provided. The method includes:

sending, by a base station, a data packet to a radio communication node, where the data packet is generated by using a Packet Data Convergence Protocol protocol data unit PDCP PDU, so that the radio communication node acquires the PDCP PDU, which is used as a Radio Link Control service data unit RLC SDU, in the data packet, and sends data generated by using the RLC SDU to a user equipment, where a user plane connection is established between the radio communication node and the user equipment, and a control plane connection is established between the base station and the user equipment.

According to the second aspect, in a first possible implementation manner, the method further includes:

receiving, by the base station, a first timer length sent by operation and administration OAM, and forwarding the first timer length to the radio communication node; or generating, by the base station, a first timer length, and sending the first timer length to the radio communication node, where the first timer length is applied to a first timer started by the radio communication node.

With reference to the second aspect or the first possible implementation manner, in a second possible implementation manner, the method further includes:

when the first timer expires, receiving, by the base station, a first status report sent by the radio communication node, where the first status report indicates that the RLC SDU is not successfully sent, so as to determine that the RLC SDU is not successfully sent; or before the first timer expires, receiving, by the base station, a first status report sent by the radio communication node, where the first status report indicates that the RLC SDU is not successfully sent, so as to determine that the RLC SDU is not successfully sent; or before the first timer expires, receiving, by the base station, no first status report sent by the radio communication node, so as to determine that the RLC SDU is not successfully sent.

According to the second aspect, in a third possible implementation manner, after the sending, by a base station, a data packet to a radio communication node, the method further includes:

receiving, by the base station, a first status report sent by the radio communication node, where the first status report is used to indicate whether the PDCP PDU is successfully sent, and the first status report is sent by the radio communication node after the radio communication node receives a second status report sent by the user equipment, where: if the second status report indicates that the user equipment successfully receives the data generated by using the RLC SDU, the first status report indicates that the PDCP PDU is successfully sent; if the second status report indicates that the user equipment does not successfully receive the data generated by using the RLC SDU, the first status report indicates that the PDCP PDU is not successfully sent; and determining, by the base station according to the first status report, whether the PDCP PDU is successfully sent.

According to the second aspect, in a fourth possible implementation manner, the method further includes:

sending, by the base station, a discard message to the radio communication node, where the discard message instructs to discard the RLC SDU corresponding to the PDCP PDU.

According to the second aspect, in a fifth possible implementation manner, the method further includes:

sending, by the base station, a second timer length to the radio communication node, where the second timer length is applied to a second timer started by the radio communication node.

According to a third aspect, a radio communication node is provided. The radio communication node includes:

a receiving unit, configured to receive a data packet sent by a base station, where the data packet is generated by using a Packet Data Convergence Protocol protocol data unit PDCP PDU of the base station;

a control unit, configured to acquire the PDCP PDU, which is used as a Radio Link Control service data unit RLC SDU, in the data packet that is received by the receiving unit; and a sending unit, configured to send data generated by the control unit by using the RLC SDU to a user equipment, where a user plane connection is established between the radio communication node and the user equipment, and a control plane connection is established between the base station and the user equipment.

According to the third aspect, in a first possible implementation manner, the radio communication node further includes:

a first timing unit, configured to start a first timer, where a first timer length of the first timer is sent by the base station or operation, administration and maintenance OAM.

According to the third aspect, in a second possible implementation manner, the receiving unit of the radio communication node is further configured to receive a second status report sent by the user equipment, where the second status report is used to indicate whether the user equipment successfully receives the data generated by using the RLC SDU; and the sending unit is configured to send a first status report to the base station, where the first status report is used to indicate whether the PDCP PDU is successfully sent, where: if the second status report received by the receiving unit indicates that the user equipment successfully receives the data generated by using the RLC SDU, the first status report indicates that the PDCP PDU is successfully sent; if the second status report received by the receiving unit indicates that the user equipment does not successfully receive the data generated by using the RLC SDU, the first status report indicates that the PDCP PDU is not successfully sent.

According to the third aspect, in a third possible implementation manner, the receiving unit of the radio communication node is further configured to receive a discard message sent by the base station, where the discard message instructs to discard the RLC SDU corresponding to the PDCP PDU; and the control unit is further configured to discard the RLC SDU according to the discard message received by the receiving unit.

According to the third aspect, in a fourth possible implementation manner, the radio communication node further includes:

a second timing unit, configured to start a second timer, where a second timer length of the second timer is sent by the base station, and if the second timer expires, the control unit is further configured to discard the RLC SDU.

According to a fourth aspect, a base station is provided. The base station includes:

a sending unit, configured to send a data packet to a radio communication node, where the data packet is generated by using a Packet Data Convergence Protocol protocol data unit PDCP PDU, so that the radio communication node acquires the PDCP PDU, which is used it as a Radio Link Control service data unit RLC SDU, in the data packet, and sends data generated by using the RLC SDU to a user equipment, where a user plane connection is established between the radio communication node and the user equipment, and a control plane connection is established between the base station and the user equipment.

According to the fourth aspect, in a first possible implementation manner, the base station further includes:

a receiving unit, configured to receive a first timer length sent by operation and administration OAM, and enable the sending unit to forward the first timer length to the radio communication node; or a control unit, configured to generate a first timer length, and enable the sending unit to send the first timer length to the radio communication node, where the first timer length is applied to a first timer started by the radio communication node.

According to the fourth aspect, in a second possible implementation manner, the receiving unit of the base station is further configured to receive a first status report sent by the radio communication node, where the first status report is used to indicate whether the PDCP PDU is successfully sent, and the first status report is sent by the radio communication node after the radio communication node receives a second status report sent by the user equipment, where: if the second status report indicates that the user equipment successfully receives the data generated by using the RLC SDU, the first status report indicates that the PDCP PDU is successfully sent; if the second status report indicates that the user equipment does not successfully receive the data generated by using the RLC SDU, the first status report indicates that the PDCP PDU is not successfully sent; and the control unit is further configured to determine, according to the first status report received by the receiving unit, whether the PDCP PDU is successfully sent.

According to the fourth aspect, in a third possible implementation manner, the sending unit of the base station is further configured to send a discard message to the radio communication node, where the discard message instructs to discard the RLC SDU corresponding to the PDCP PDU.

According to the fourth aspect, in a fourth possible implementation manner, the sending unit of the base station is further configured to send a second timer length to the radio communication node, where the second timer length is applied to a second timer started by the radio communication node.

According to a fifth aspect, a radio communication node is provided. The radio communication node includes:

a receiver, configured to receive a data packet sent by a base station, where the data packet is generated by using a Packet Data Convergence Protocol protocol data unit PDCP PDU of the base station;

a processor, configured to acquire the PDCP PDU, which is used as a Radio Link Control service data unit RLC SDU, in the data packet that is received by the receiver; and a sender, configured to send data generated by the processor by using the RLC SDU to a user equipment, where a user plane connection is established between the radio communication node and the user equipment, and a control plane connection is established between the base station and the user equipment.

According to the fifth aspect, in a first possible implementation manner, the processor of the radio communication node is further configured to start a first timer, where a first timer length of the first timer is sent by the base station or operation, administration and maintenance OAM.

According to the fifth aspect, in a second possible implementation manner, the radio communication node is specifically implemented as follows:

the receiver is configured to receive a second status report sent by the user equipment, where the second status report is used to indicate whether the user equipment successfully receives the data generated by using the RLC SDU; and the sender is further configured to send a first status report to the base station, where the first status report is used to indicate whether the PDCP PDU is successfully sent, where: if the second status report received by the receiver indicates that the user equipment successfully receives the data generated by using the RLC SDU, the first status report indicates that the PDCP PDU is successfully sent; if the second status report received by the receiver indicates that the user equipment does not successfully receive the data generated by using the RLC SDU, the first status report indicates that the PDCP PDU is not successfully sent.

According to the fifth aspect, in a third possible implementation manner, the receiver of the radio communication node is further configured to receive a discard message sent by the base station, where the discard message instructs to discard the RLC SDU corresponding to the PDCP PDU; and the processor is further configured to discard the RLC SDU according to the discard message received by the receiver.

According to the fifth aspect, in a fourth possible implementation manner, the processor of the radio communications node is further configured to start a second timer, where a second timer length of the second timer is sent by the base station, and if the second timer expires, the processor is further configured to discard the RLC SDU.

According to a sixth aspect, a base station is provided. The base station includes:

a sender, configured to send a data packet to a radio communication node, where the data packet is generated by using a PDCP data unit PDU, so that the radio communication node acquires the PDCP PDU, which is used as a Radio Link Control service data unit RLC SDU, in the data packet, and sends data generated by using the RLC SDU to a user equipment, where a user plane connection is established between the radio communication node and the user equipment, and a control plane connection is established between the base station and the user equipment.

According to the fifth aspect, in a first possible implementation manner, the base station further includes:

a receiver, configured to receive a first timer length sent by operation and administration OAM, and enable the sender to forward the first timer length to the radio communication node; or a processor, configured to generate a first timer length, and enable the sender to send the first timer length to the radio communication node, where the first timer length is applied to a first timer started by the radio communication node.

According to the sixth aspect, in a second possible implementation manner, the receiver of the base station is configured to receive a first status report sent by the radio communication node, where the first status report is used to indicate whether the PDCP PDU is successfully sent, and the first status report is sent by the radio communication node after the radio communication node receives a second status report sent by the user equipment, where: if the second status report indicates that the user equipment successfully receives the data generated by using the RLC SDU, the first status report indicates that the PDCP PDU is successfully sent; if the second status report indicates that the user equipment does not successfully receive the data generated by using the RLC SDU, the first status report indicates that the PDCP PDU is not successfully sent; and the processor is further configured to determine, according to the first status report received by the receiver, whether the PDCP PDU is successfully sent.

According to the sixth aspect, in a third possible implementation manner, the sender of the base station is further configured to send a discard message to the radio communication node, where the discard message instructs to discard the RLC SDU corresponding to the PDCP PDU.

According to the sixth aspect, in a fourth possible implementation manner, the sender of the base station is further configured to send a second timer length to the radio communication node, where the second timer length is applied to a second timer started by the radio communication node.

By using the foregoing solutions, a radio communication node receives a data packet sent by a base station, where the data packet is generated by using a Packet Data Convergence Protocol protocol data unit of the base station, acquires the Packet Data Convergence Protocol protocol data unit, and which is used as a Radio Link Control service data unit, in the data packet, and sends data generated by using the Radio Link Control service data unit to a user equipment. In this way, to interact with a Packet Data Convergence Protocol layer of the radio communications nod, the base station only needs to be provided with a Radio Link Control layer, and further, it is ensured that for data in acknowledged or unacknowledged mode agreed on by the base station and the radio communication node, data transmission requirements are met according to different mode requirements. In addition, because the base station and the radio communication node perform coordinated multi-point data transmission with the user equipment, a throughput of the user equipment is improved.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Some existing networks have long backhaul delays and narrow bandwidth; the backhauls and bandwidth of such networks are not desirable and are limited. In order to effectively improve a throughput of a user equipment in a limited backhaul, a new network architecture includes a base station, a radio communication node (the radio communication node has a scheduling function), and a user equipment (UE), where a control plane connection, for example, an Radio Resource Control (RRC) connection, is established between the UE and the base station, and a user plane connection is established between the UE and the radio communication node. For services that are of a same UE and meet a type of quality of service (QoS), the base station sends data to one or more radio communication nodes for transmission. In this way, the radio communication node can also implement data transmission with the UE, thereby improving a throughput of the UE. Further, a user plane connection may further be established between the base station and the UE.

Exemplarily, the base station may be a macro base station; the radio communication node has a resource scheduling function, and may be a macro base station, a small-cell base station, a micro base station, a relay node, a home base station, or a transmission point (TP) that has a scheduling function.

A data transmission method and apparatus provided in the embodiments of the present disclosure are applied to the foregoing network architecture, so as to ensure inter-layer interaction between a Packet Data Convergence Protocol layer and a Radio Link Control layer of different apparatuses in the foregoing networks, further satisfy data transmission requirements, and therefore improve a throughput of a UE.

Figure 1:
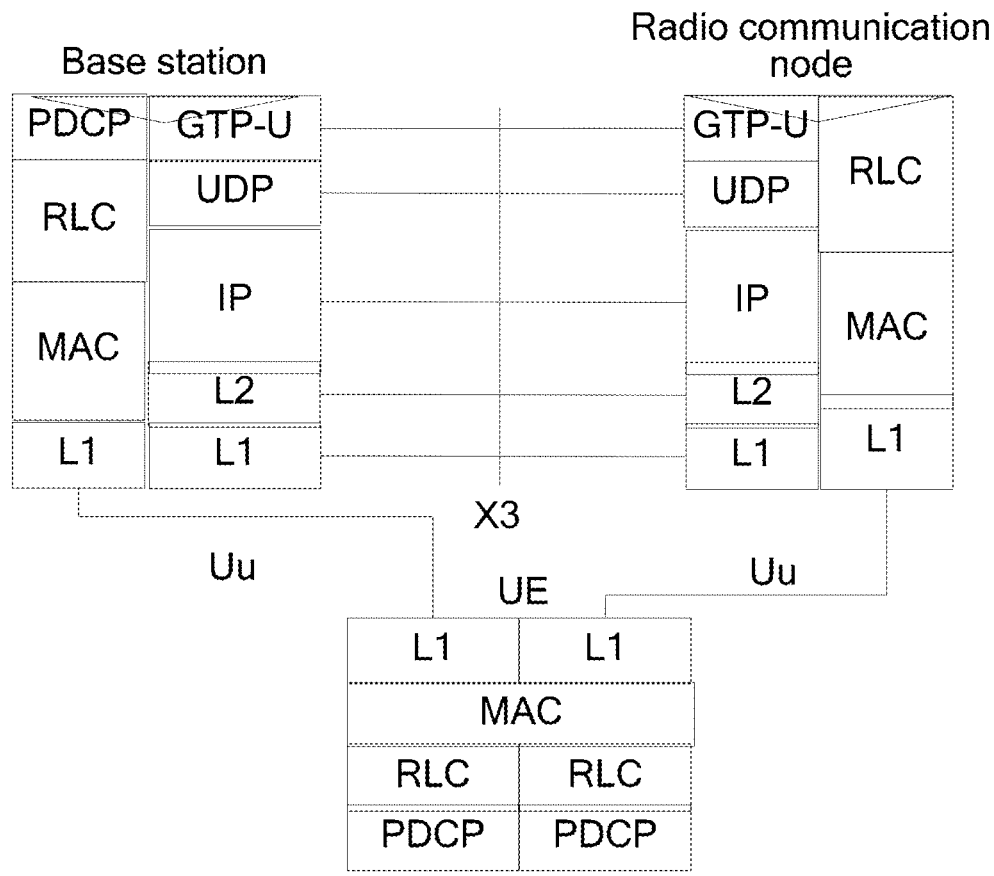
FIG. 1 is a schematic structural diagram of protocol stacks of a base station and a radio communication node according to an embodiment of the present disclosure.

Specifically, in an embodiment of the present disclosure, protocol stacks of a base station and a radio communication node are shown in FIG. 1. FIG. 1 is a schematic diagram of user plane protocol stacks among a terminal, the base station, and the radio communication node. An interface between the terminal and the base station, and an interface between the terminal and the radio communication node are both wireless interfaces, for example, a Uu interface. The user plane protocol stack of the Uu interface on a base station side, from a bottom layer to a top layer, includes: an L1 layer (physical layer), a Media Access Control (MAC) layer, an Radio Link Control (RLC) layer, and a Packet Data Convergence Protocol (PDCP) layer. The user plane protocol stack of the Uu interface on a radio communication node side, from a bottom layer to a top layer, includes: an L1 layer, a MAC layer, and an RLC layer. An interface between the base station and the radio communication node is a wired interface or a wireless interface. In the figure, it is assumed that the interface between the base station and the radio communication node is an X3 interface, and a user plane protocol stack of the X3 interface, from a bottom layer to a top layer, includes an L1 layer, an L2 layer (that is, a data link layer), an Internet Protocol (IP) layer, a User Datagram Protocol (UDP) layer, and a GPRS Tunnelling Protocol for user plane (GTP-U) layer. It should be noted that in FIG. 1, a connection line between the base station and the radio communication node indicates only a correspondence between same protocol layers but not an actual connection relationship between the same protocol layers.

Figure 2:
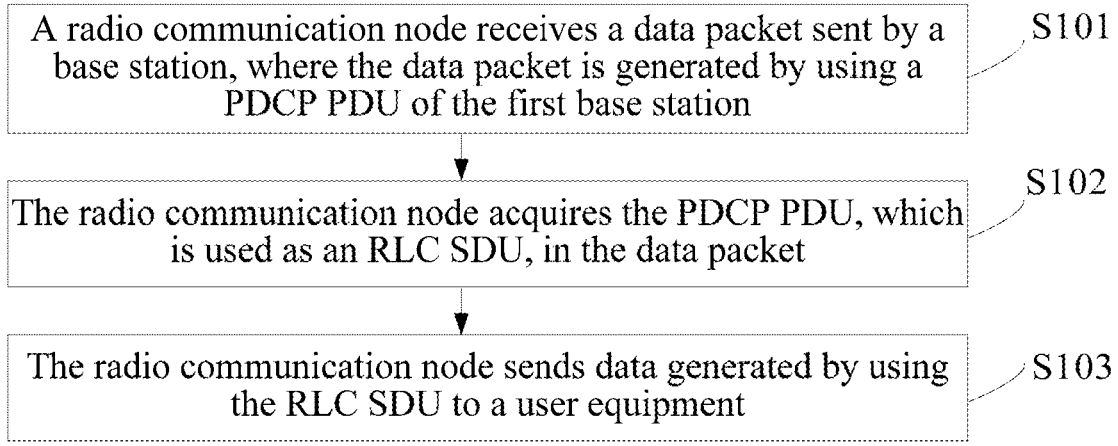
FIG. 2 is a schematic flowchart of a data transmission method on a radio communication node side according to an embodiment of the present disclosure.

A data transmission control method provided in this embodiment of the present disclosure may be applied to a system that includes a base station, a radio communication node and a UE. As shown in FIG. 2, the method is a method on a radio communication node side. Steps of the method include:

S101. A radio communication node receives a data packet sent by a base station, where the data packet is generated by using a PDCP protocol data unit (PDU) of the base station.

In this embodiment of the present disclosure, the base station sends the data packet to the radio communication node, and the radio communication node transmits the data packet to a UE. However, the base station needs to send the PDCP PDU to the radio communication node, and the radio communication node needs to generate a data packet by using the PDCP PDU, and then send the data packet to the UE. However, interaction between the base station and the radio communication node is different from an exchange between a PDCP layer and an RLC player within a same device. No interface exists between a PDCP layer of the base station and an RLC layer of the radio communication node, and therefore, the PDCP layer of the base station and the RLC layer of the radio communication node cannot directly communicate with each other. Therefore, in this embodiment of the present disclosure, a PDCP protocol entity of the base station generates a PDCP PDU, and the PDCP PDU is encapsulated in a data packet of a transport protocol layer (such as a GPRS Tunnelling Protocol for user plane (GTP-U)). The base station transmits the data packet to a transport protocol layer of the radio communication node by using a transport protocol layer tunnel, where the transport protocol layer tunnel is associated with an identity of the UE and a bearer identity. After learning the identity of the UE and the bearer identity that are associated with the tunnel, a transport protocol layer (such as the GTP-U) of the radio communication node transmits the PDCP PDU corresponding to the data packet to an RLC protocol entity corresponding to the identity of the UE and the bearer identity.

Manners of the foregoing interaction between the base station and the radio communication node include but are not limited to the following three manners:

First manner: between the base station and the radio communication node, a unique transmission tunnel between the base station and the radio communication node is established at the transport protocol layer (such as the GTP-U) for each bearer of each UE, and each transmission tunnel between the base station and the radio communication node has a unique transmission tunnel identifier. The UE identities (IDs) and bearer identities are associated with the identifiers of the transmission tunnels between the base station and the radio communication node during establishment of the tunnels.

Second manner: between the base station and the radio communication node, one or more transmission tunnels between the base station and the radio communication node are established at the transport protocol layer (such as the GTP-U) for each UE, and each transmission tunnel between the base station and the radio communication node has a unique transmission tunnel identifier. The UE IDs are associated with the transmission tunnel identifiers during establishment of the tunnels. During data transmission, radio bearer (RB) identities are added to PDUs at the transport protocol layer (such as the GTP-U), which are used to distinguish data, of different bearers, transmitted on a same transmission tunnel between the base station and the radio communication node.

Third manner: between the base station and the radio communication node, one or more transmission tunnels between the base station and the radio communication node are established at the transport protocol layer (such as the GTP-U) for all UEs, and each transmission tunnel between the base station and the radio communication node has a unique transmission tunnel identifier. The UE IDs and bearer identities do not have a correspondence to the tunnel identifiers. During data transmission, the UE IDs and RB identities are added to PDUs at the transport protocol layer (such as the GTP-U), which are used to distinguish data, of different bearers of different UEs, transmitted on a same transmission tunnel between the base station and the radio communication node.

S102. The radio communication node acquires the PDCP PDU, and which is used as an RLC service data unit (SDU), in the data packet.

Specifically, the PDCP PDU is generated by the PDCP layer of the base station. The data packet is generated after the transport protocol layer of the base station, such as the GPRS Packet Radio Service Tunnelling Protocol for user plane (GTP-U) encapsulates the PDCP PDU.

Further, before S101, the base station generates corresponding radio bearers for different bearers of different UEs according to UE IDs, E-UTRAN-Radio Access Bearer (E-RAB) identities, and a Qos attribute of each E-RAB that are received from an mobility management entity (MME), where the radio bearer includes a PDCP protocol entity, and an radio bearer (RB) ID or an logical channel (LCH) ID corresponding to the PDCP protocol entity. For example, a first UE requests video watching, and after receiving a request of the MME, the base station generates a PDCP entity corresponding to a bearer, where the bearer is a bearer corresponding to the video service of the first UE.

Correspondingly, the radio communication node receives configurations of the base station, where the configurations include UE IDs, bearer identities, and configurations of RLC layers; the configurations are used to create corresponding radio bearers for different bearers of different UEs, where the radio bearer includes an RLC protocol entity, and an RB ID or an LCH ID corresponding to the RLC protocol entity. The bearer identity may be an RB ID, an E-UTRAN Radio Access Bearer (E-RAB) ID, an evolved packet system bearer identity (EPS Bearer ID), or an LCH ID. For example, for a first UE that requests video watching, the radio communication node generates an RLC entity corresponding to a bearer, where the bearer is a bearer corresponding to the video service of the first UE (it should be noted that the bearer that is in the radio communication node and corresponding to the video service of the first UE is the same as the bearer that is in the base station and corresponding to the video service of the first UE).

Subsequently, the base station generates the PDCP PDU by using the PDCP entity and transmits the PDCP PDU to the transport protocol layer of the base station, so that the transport protocol layer of the base station generates the data packet and sends the data packet to the radio communication node. Subsequently, the radio communication node acquires, by using the RLC entity, the PDCP PDU transmitted by the transport protocol layer of the radio communication node.

S103. The radio communication node sends data generated by using the RLC SDU to a UE.

A control plane connection is established between the base station and the UE, and a user plane connection is established between the radio communication node and the UE. Optionally, a user plane connection may further be established between the base station and the UE.

It should be noted that the data generated by using the RLC SDU is an RLC PDU of the radio communication node. The control plane connection is established between the UE and the base station, and a user plane connection is established between the UE and the radio communication node. The RLC layer of the radio communication node may perform segmentation and concatenation on an RLC SDU to form an RLC PDU, or may not perform segmentation and concatenation. The description herein uses segmentation and concatenation as an example, and other cases also fall within the protection scope. If an RLC SDU is relatively large, the radio communication node segments the RLC SDU into three small data packets, and sends the three small data packets as RLC PDUs to the UE; if an RLC SDU is relatively small, the radio communication node may concatenate multiple RLC SDUs to obtain a large data packet, and send the data packet as an RLC PDU to the UE; if an RLC SDU has an appropriate size, the radio communication node sends the RLC SDU as an RLC PDU to the UE. If an RLC SDU has an appropriate size, one RLC SDU may be used as an RLC PDU and sent to the UE.

In the data transmission control method provided in this embodiment of the present disclosure, to implement interaction between the radio communication node and the base station, the radio communication node only needs to provide a PDCP layer and the base station only needs to provide an RLC layer. Because both the base station and the radio communication node perform coordinated multi-point data transmission with the UE, a throughput of the UE is improved.

Figure 3:
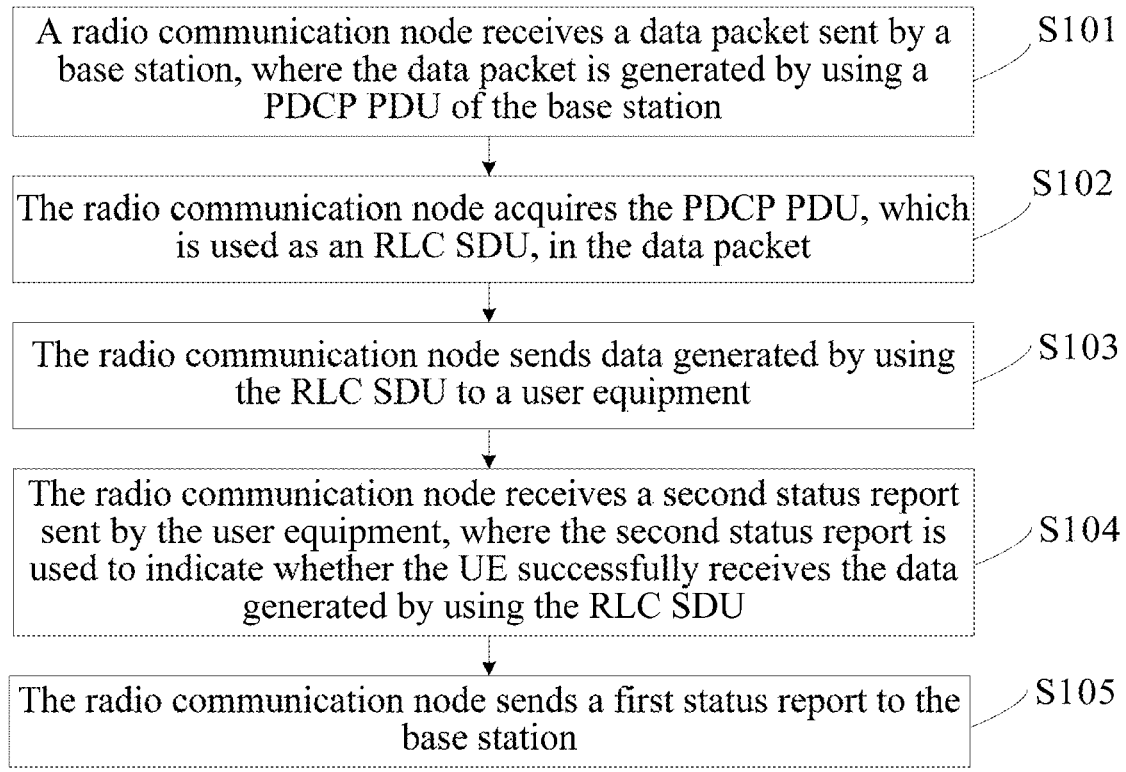
FIG. 3 is a schematic flowchart of a data transmission method on a radio communication node side according to another embodiment of the present disclosure.

Further, in another embodiment, as shown in FIG. 3, after the foregoing step S103 is performed, step S104 and step S105 may further be performed sequentially.

S104. The radio communication node receives a second status report sent by the UE, where the second status report is used to indicate whether the UE successfully receives the data generated by using the RLC SDU.

It should be noted that, if the second status report sent by the UE and received by the radio communication node is acknowledgement (ACK), the second status report is used to indicate that the UE successfully receives the data generated by using the RLC SDU; if the second status report sent by the UE and received by the radio communication node is negative acknowledgement (NACK), the second status report is used to indicate that the UE does not successfully receive the data generated by using the RLC SDU, and the radio communication node re-transmits, to the UE, the data such as an RLC PDU generated by using the RLC SDU, until a maximum number of re-transmissions or maximum re-transmission time for the RLC PDU is reached. The radio communication node determines that the RLC PDU is not successfully sent, that is, the data generated by using the RLC SDU is not successfully sent.

It is assumed that a maximum number of re-transmissions preset in the radio communication node is 5. After the radio communication node sends an RLC PDU for the first time, if a second status report that is intended for the RLC PDU, sent by the UE, and received by the radio communication node is NACK, the radio communication node re-transmits the RLC PDU to the UE. If a second status report that is intended for the RLC PDU, sent by the UE, and received by the radio communication node is still NACK after the radio communication node re-transmits the RLC PDU for the fifth time, the radio communication node determines that the RLC PDU is not successfully sent. If a second status report that is intended for the RLC PDU, sent by the UE, and received by the radio communication node is ACK after the radio communications node re-transmits the RLC PDU for the third time, the radio communication node stops re-transmitting the RLC PDU, and determines that the RLC PDU is successfully sent. Alternatively, it is assumed that time preset in the radio communication node is 1 second. If all second status reports that are intended for an RLC PDU and received by the radio communication node within 1 second are NACK, the radio communication node determines that the RLC PDU is not successfully transmitted. However, no matter how many times NACK is received for the RLC PDU within 1 second, the radio communication node determines that the RLC PDU is successfully sent as long as one second status report that is ACK is received.

Further, if the RLC PDU is formed by segmenting an RLC SDU, when the RLC PDU is not successfully sent, the radio communication node can still determine that the RLC SDU is not successfully sent even if all RLC PDUs except the RLC PDU that are formed by segmenting the RLC SDU are successfully sent. If the RLC PDU is formed by concatenating RLC SDUs, when the RLC PDU is not successfully sent, the radio communication node determines that none of the multiple concatenated RLC SDUs is successfully sent.

In addition, if the RLC PDU is formed by segmenting an RLC SDU, when all RLC PDUs formed by segmenting the RLC SDU are successfully sent, the radio communication node can still determine that the RLC SDU is successfully sent. If the RLC PDU is formed by concatenating RLC SDUs, when the RLC PDU is successfully sent, the radio communication node determines that the multiple cascaded RLC SDUs are all successfully sent.

S105. The radio communication node sends a first status report to the base station.

The first status report is used to indicate whether the PDCP PDU is successfully sent, where: if the second status report indicates that the UE successfully receives the data generated by using the RLC SDU, the first status report indicates that the PDCP PDU is successfully sent; if the second status report indicates that the UE does not successfully receive the data generated by using the RLC SDU, the first status report indicates that the PDCP PDU is not successfully sent.

Further, for data in acknowledged mode (AM), a first status report may be sent to the base station according to different rules, where the first status report may indicate whether an RLC SDU is successfully sent, that is, the first status report indicates that content transmitted in the status report is an identifier of an RLC SDU that is successfully sent and/or an identifier of an RLC SDU that is not successfully sent.

That the first status report indicates whether an RLC SDU is successfully sent may be implemented by presetting a first timer length. Alternatively, one specific bit in a message body of the first status report may be used to indicate whether an RLC SDU is successfully sent. For example, it is set, in a data string of the first status report, that a specific bit of 1 or 0 indicates whether the RLC SDU is successfully sent: For example, the bit being 1 indicates that content transmitted in the status report message is an identifier of an RLC SDU that is successfully sent, and the bit being 0 indicates that content transmitted in the first status report is an identifier of an RLC SDU that is not successfully sent. Alternatively, content transmitted in the first status report may be implicitly indicated by using a message name, or may be stipulated in a protocol, so that the base station learns the content transmitted in the first status report when receiving the first status report message.

Further, the first status report may include the following content:

The first status report may include only an identifier of an RLC SDU, where the identifier may be a PDCP sequence number of a PDCP PDU, and the sequence number may be obtained by decoding. Alternatively, the identifier may also be a sequence number of the RLC SDU that is agreed on with the base station. For example, an RLC SDU 1, an RLC SDU 2, an RLC SDU 3, an RLC SDU 4, and an RLC SDU 5 correspond to a PDCP PDU 1, a PDCP PDU 3, a PDCP PDU 5, a PDCP PDU 7, and a PDCP PDU 9, and whether the PDCP PDU 3 is successfully sent may be determined according to whether the RLC SDU 2 is successfully sent. In this case, an ID of a UE to which the identifier of the RLC SDU belongs, and a bearer ID (for example, may be an RB ID, an E-RAB ID, or an EPS Bearer ID) of the UE may be identified by using a transmission tunnel between the radio communication node and the base station. That is, a unique transmission tunnel is established at a transport protocol layer (such as a GTP-U) between base stations for each bearer of each UE, and each transmission tunnel between base stations has a unique identifier of a transmission tunnel between base stations. The UE ID and bearer identity are associated with the identifier of the transmission tunnel between base stations during establishment of the tunnel. The tunnel is identified by using two transport layer addresses of base stations and two tunnel endpoint identifiers. It is assumed that there are two UEs and each UE has two DRBs or E-RABs. A first status report about a DRB 1 or an E-RAB 1 of a UE 1 is transmitted on a tunnel 1, and a first status report about a DRB 2 or an E-RAB 2 of the UE 1 is transmitted on a tunnel 2; a first status report about a DRB 1 or an E-RAB 1 of a UE 2 is transmitted on a tunnel 3, and a first status report about a DRB 2 or an E-RAB 2 of the UE 2 is transmitted on a tunnel 4. This transmission manner enables the base station to know a UE to which the identifier in the first status report belongs and a DRB ID of the UE when the base station receives the first status report.

Further, in addition to the foregoing identifier, the first status report may further include a bearer identity. It should be noted that if the first status report carries a bearer ID, it indicates that a UE identity of the first status report may be identified by using a transmission tunnel between the radio communication node and the base station. That is, one or more transmission tunnels are established at a transport protocol layer (such as a GTP-U) between base stations for each UE, and each transmission tunnel between base stations has a unique identifier of a transmission tunnel between base stations. The UE ID is associated with the identifier of the transmission tunnel between base stations during establishment of the tunnel. It is assumed that there are two UEs, and each UE has two DRBs or E-RABs. A first status report about a DRB 1 and a DRB 2 (or an E-RAB 1 and an E-RAB 2) of a UE 1 is transmitted on a tunnel 1; a first status report about a DRB 1 and a DRB 2 (or an E-RAB 1 and an E-RAB 2) of a UE 2 is transmitted on a tunnel 2.

If the first status report carries a UE ID and a bearer ID, the base station may clearly know a UE to which the identifier in the first status report belongs and a DRB ID or an E-RAB ID of the UE. Further, the first status report may be transmitted through a control plane interface between base stations or a transmission tunnel at the transport protocol layer between base stations.

It should be noted that if the first status report is transmitted through the transmission tunnel at the transport protocol layer between base stations, in order to distinguish content (which may be a GTP-U data packet encapsulated by using a PDCP PDU, or a GTP-U data packet encapsulated by using the first status report, or a GTP-U data packet encapsulated by using a discard message) transmitted on the transmission tunnel at the transport protocol layer between base stations, a type indication packet header should further be added to a GTP-U data packet, which is used to indicate a type of data transmitted in the GTP-U data packet.

Further, if the first status report includes only an identifier of one RLC SDU, in order to reduce overheads of the first status report message, if the identifier of the RLC SDU is consecutive to an identifier of an RLC SDU in a previous first status report, a bit position 1 in the first status report indicates that the identifier of the RLC SDU is continuity of the identifier of the RLC SDU in the previous first status report.

If the first status report includes identifiers of multiple RLC SDUs, in order to reduce overheads of the first status report message, the first status report includes identifiers of inconsecutive RLC SDUs, an identifier of an RLC SDU having a minimum sequence number or a maximum sequence number in a group of consecutive values, and an offset value, where the offset value indicates the number of consecutive RLC SDUs in the group of consecutive values, or the number of consecutive RLC SDUs minus one in the group of consecutive values.

Alternatively, if the first status report includes identifiers of at least two consecutive RLC SDUs, the identifiers of the RLC SDUs include an identifier of a RLC SDU having a minimum sequence number that is successfully sent or not successfully sent and a bit string. Each bit in each bit string indicates a status of an RLC SDU after the RLC SDU having the minimum sequence number that is successfully sent or not successfully sent, and the status indicates whether the RLC SDU is successfully sent.

Exemplarily, that the radio communication node may send a first status report to the base station according to different rules may be as follows:

The radio communication node triggers a first status report based on an event. That is, if the radio communication node can detect an RLC layer and determine that an RLC SDU that is successfully sent or not successfully sent exists at the RLC layer, the radio communication node sends a first status report to the base station, so that the base station determines, according to the first status report, a case in which a PDCP PDU is successfully sent.

Alternatively, the radio communication node may also trigger a status report based on a period. That is, the radio communication node sets a period, for example, 10 seconds, and if the radio communication node determines, within every 10 seconds according to a case in which an RLC PDU is successfully sent, that an RLC SDU is successfully sent or not successfully sent, the radio communication node sends a first status report to the base station, so that the base station determines, according to the first status report, a case in which a PDCP PDU is successfully sent.

Alternatively, the radio communication node may also trigger a status report based on a request. That is, after receiving a request message sent by the base station, the radio communication node sends a first status report to the base station, so that the base station determines, according to the first status report, a case in which a PDCP PDU is successfully sent.

Further (based on the foregoing several cases), if the first status report includes an identifier of an RLC SDU that is not successfully sent, in order to enable the base station to determine that a PDCP PDU is successfully sent, the following preset rules should be provided:

Before S101, a first timer length sent by operation, administration and maintenance (OAM) is first received. The first timer length is set to a value for the radio communication node.

Alternatively, before S101, a first timer length sent by the base station is first received, where the first timer length is set to a value for the radio communication node; or UE IDs may also be received at the same time when the first timer length is received, which indicates that the first timer length may be set to different values or a same value for different UEs; or UE IDs and DRB IDs or E-RAB IDs may also be received at the same time when the first timer length is received, which indicates that the first timer length may also be set to different values or a same value for different DRBs or E-RABs of different UEs.

The radio communication node maintains a first timer for each RLC SDU of a DRB ID or an E-RAB ID of a corresponding UE, where time of the first timer is the first timer length. The first timer functions as follows: within the first timer length maintained by the first timer, if the RLC SDU is not successfully sent, a status report is sent to the base station, and if the RLC SDU is successfully sent, no status report is sent.

Further, because a delay occurs when data is sent between the base station and the radio communication node, a delay value may be determined according to conditions such as specific locations where the base station and the radio communication node are disposed. The first timer length in the base station is updated by using the delay value, for example, twice as much as data delay time is added to a preset first timer length.

Exemplarily, in addition to the foregoing cases, for data in AM or unacknowledged mode (UAKM), if the radio communication node receives a discard message of the base station, the radio communication node determines, according to the discard message, data that needs to be discarded, and discards the data. Further, the discard message may include an identifier of an RLC SDU, where the identifier may be a sequence number of a packet header of a PDCP PDU sent by the base station to the radio communication node, or may also be a code of the RLC SDU that is agreed on with the radio communication node. For example, an RLC SDU 1, an RLC SDU 2, an RLC SDU 3, an RLC SDU 4, and an RLC SDU 5 correspond to a PDCP PDU 1, a PDCP PDU 3, a PDCP PDU 5, a PDCP PDU 7, and a PDCP PDU 9, and that the PDCP PDU 3 is successfully sent may be determined according to that the RLC SDU 2 is successfully sent. When at least one group of consecutive values are included, in order to reduce overheads of the discard message, content of the discard message may be: identifiers of inconsecutive RLC SDUs, an identifier of an RLC SDU having a minimum sequence number or a maximum sequence number in a group of consecutive values, and an offset value, where the offset value indicates the number of consecutive RLC SDUs in the group of consecutive values or the number of consecutive RLC SDUs minus one.

Further, the discard message may further include a UE ID, a DRB of a UE, or a UE ID and a DRB of a UE, or the discard message may also include a UE ID, an E-RAB ID, or a UE ID and an E-RAB ID, so that the base station determines a UE to which the identifier of the RLC SDU belongs and a DRB ID or an E-RAB ID of the UE.

It should be pointed out that a transmission method of the discard message is the same as that of the first status report, and details are not described herein again.

Alternatively, a second timer length may be received, or a UE ID and a DRB ID (or an E-RAB ID) may also be received at the same time when a second timer length is received, and the second timer length is maintained at the RLC layer by using a second timer. The second timer length may be sent by the base station to the radio communication node when the radio communication node is configured or when the radio communication node is activated, and the second timer length may be set to different values or a same value for different DRBs or E-RABs of different UEs. The radio communication node sets, according to the second timer length, a second timer for each UE and for an RLC SDU of a DRB ID or an E-RAB ID corresponding to the UE.

Time of the second timer is the second timer length. When storage time of data to be discarded exceeds the second timer length maintained by the second timer, the radio communication node discards the corresponding RLC SDU.

In the data transmission control method provided in this embodiment of the present disclosure, to implement interaction between the radio communication node and the base station, the radio communication node only needs to provide a PDCP layer and the base station only needs to provide an RLC layer, and it can be determined, according to a first status report, whether data for interaction is successfully sent. Therefore, while a throughput of a UE is improved, the base station can determine whether a data packet destined to the radio communication node is successfully sent, so as to avoid situations such as repeated sending, thereby improving system performance.

Figure 4:
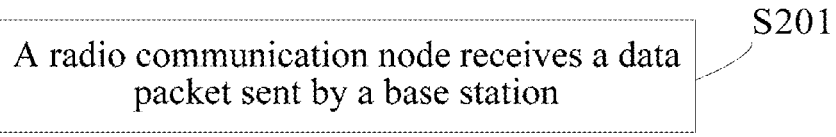
FIG. 4 is a schematic flowchart of a data transmission method on a base station side according to an embodiment of the present disclosure.

A data transmission control method provided in an embodiment of the present disclosure may be applied to a system in which a base station, a radio communication node, and a UE exist. As shown in FIG. 4, the method is a method on a base station side. Steps of the method include:

S201. A radio communication node receives a data packet sent by a base station.

It should be noted that a user plane connection is established between a UE and the radio communication node, and a control plane connection is established between the UE and the base station. In acknowledged mode, after sending a PDCP PDU at a PDCP layer to an RLC layer of the radio communication node, the base station may determine, by using a received first status report replied by the RLC layer of the radio communication node, whether the PDCP PDU is successfully sent, or the base station may also determine whether the PDCP PDU is successfully sent by using the following method:

For data in acknowledged mode, the base station may receive a first timer length sent by OAM and send the first timer length to the radio communication node. Alternatively, the base station maintains a first timer for a PDCP PDU of a DRB ID or an E-RAB ID of each UE, where time of the first timer is an updated first timer length, and the updated first timer length is greater than or equal to the original first timer length, where the updated first timer length may be a sum of the first timer length and an offset value, where the offset value is greater than or equal to twice a backhaul link delay between the base station and the radio communication node, mainly considering impact of the backhaul link delay on transmission of a data packet. The first timer functions as follows: within the first timer, that is, within the first timer length maintained by the first timer, if a status report that is sent by the radio communication node and received by the base station is an unsuccessfully-sent first status report in terms of a status report type, and an identifier of the foregoing PDCP PDU does not exist in the first status report, it is considered that the PDCP PDU is successfully sent.

In this way, when the PDCP PDU in the radio communication node is not successfully sent, the base station re-transmits the PDCP PDU by using an RLC layer of the base station or another radio communication node. Alternatively, when the UE is handed over from the base station to another base station, the original base station sends temporarily stored data of the UE to the target base station, which can ensure lossless transmission of the data.

Further, for data in acknowledged mode or unacknowledged mode, the base station sends a discard message to the radio communication node, where the discard message includes an identifier of an RLC SDU.

It should be noted that the base station may further maintain a second timer, that is, a timeout timer, for a PDCP SDU corresponding to each PDCP PDU, where duration of the timeout timer is a second timer length, for example, 10 seconds, and if the duration of 10 seconds expires, the base station sends a discard message to the radio communication node. The second timer length is set for a DRB ID or an E-RAB ID of each UE.

Alternatively, the base station receives a PDCP status report sent by a UE, where the PDCP status report indicates that the PDCP PDU is successfully received. The base station sends a discard message to the radio communication node, so that the radio communication node discards an RLC SDU according to the discard message, where content of the discard message is described in the foregoing embodiment, and details are not described herein again. In this way, the radio communication node may not need to temporarily store a large amount of data, thereby releasing storage space of the radio communication node.

Alternatively, the base station may send a second timer length to the radio communication node, where duration of the second timer length is time of the timeout timer of the PDCP SDU corresponding to the PDCP PDU, so that the radio communication node discards a first SDU after the second timer length maintained by the second timer expires. In this way, the radio communication node may not need to temporarily store a large amount of data, thereby releasing storage space of the radio communication node.

In the data transmission control method provided in this embodiment of the present disclosure, a radio communication node receives a data packet sent by a base station, where the data packet is generated by using a PDCP PDU of the base station, and the radio communication node acquires the PDCP PDU, which is used as an RLC SDU, in the data packet, and sends data generated by using the RLC SDU to a UE. In this way, to interact with a PDCP layer of the radio communication node, the base station only needs to be provided with an RLC layer, and it is further ensured that, for data in acknowledged or unacknowledged mode agreed on by the base station and the radio communication node, data transmission requirements are met according to different mode requirements. In addition, because the base station and the radio communication node perform coordinated multi-point data transmission with the user equipment, a throughput of the user equipment is improved.

Figure 5:
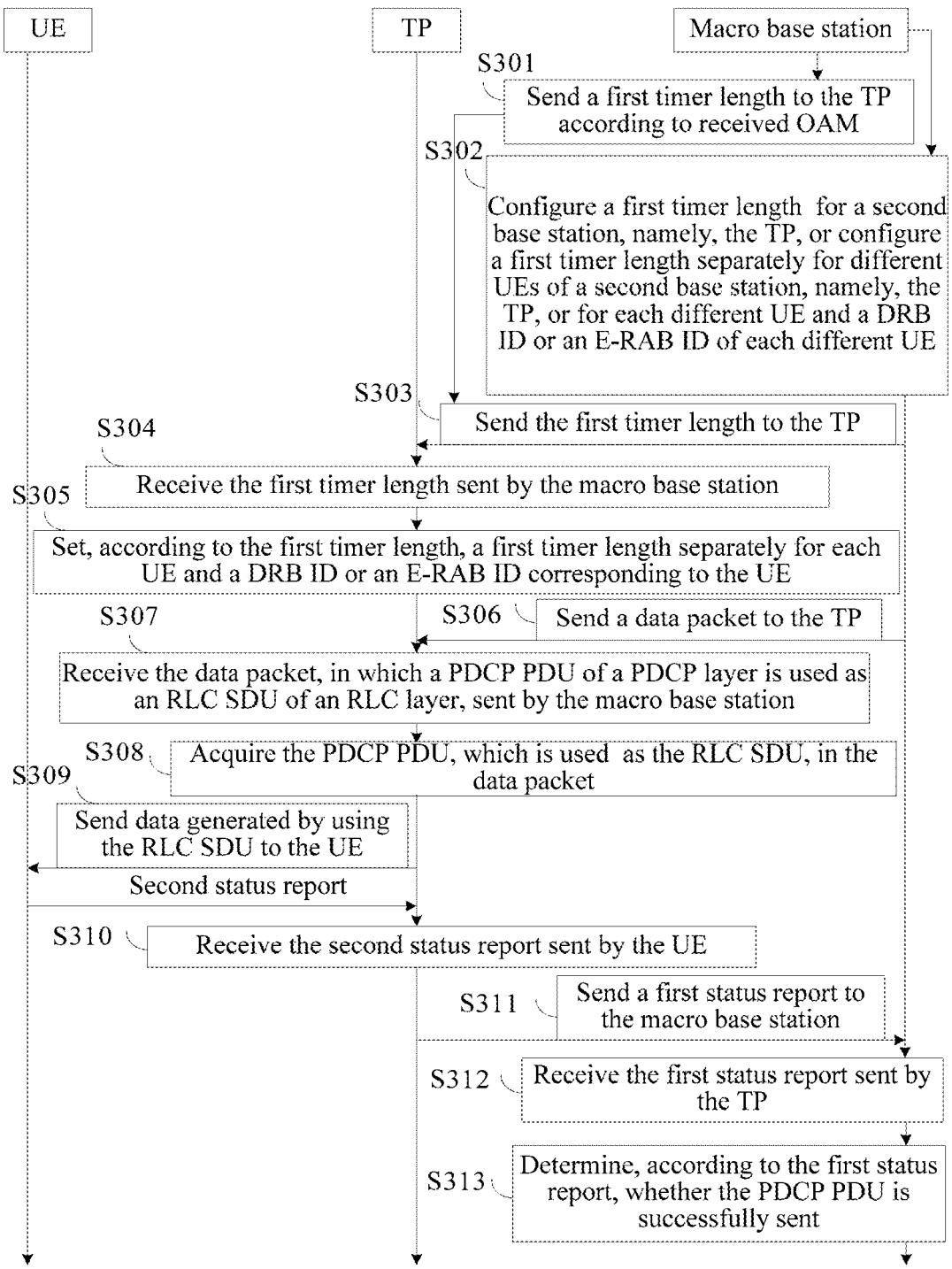
FIG. 5 is a schematic flowchart of a data transmission method according to an embodiment of the present disclosure.

A data transmission method provided by another embodiment of the present disclosure is shown in FIG. 5. This embodiment is described by using an example in which, in acknowledged mode, a base station is a macro base station, a radio communication node is a TP, and the macro base station and the TP jointly maintain a first timer in which sending is assumed to be successful by default, but the embodiment of the present disclosure is not limited thereto. Steps of the method include:

S301. A macro base station sends a first timer length to a TP according to that received from OAM.

S302. A macro base station configures a first timer length for a TP, or configures a first timer length separately for different UEs of a TP, or for each different UE and a DRB ID or an E-RAB ID of each different UE.

It should be pointed out that one of step S301 and step S302 is selected to be performed, and step S303 is performed after step S302 and is not performed together with step S301.

It should be noted that if the macro base station determines a DRB ID or an E-RAB ID of each UE according to Qos of a service requested by the UE, a first timer length is configured separately for the DRB ID or the E-RAB ID corresponding to each UE. For example, for a video request of a first UE in a case of a bandwidth of 3 MB, the first timer length is set to 2 milliseconds, and for a video request of the first UE in a case of a bandwidth of 2 MB and a long delay, the first timer length is set to 5 milliseconds.

If the macro base station receives the first timer length sent by the OAM, the macro base station performs configuration according to the first timer length, and may forward or may not forward the first timer length to the TP.

S303. The macro base station sends the first timer length to the TP.

It should be noted that the first timer length may be set to different values or a same value for different UEs, may also be set to different values or a same value for different DRBs or E-RABs of different UEs, and may further be set to a value for a radio communication node.

It should be noted that the macro base station may not send the first timer length to the TP; instead, the OAM sends the first timer length to the TP. This embodiment is described by using an example in which the macro base station sends the first timer length to the TP, that the OAM sends the first timer length to the TP also falls within the protection scope, and the embodiment of the present disclosure is not limited thereto.

S304. The TP receives the first timer length sent by the macro base station.

S305. The TP sets, according to the first timer length, a first timer length separately for each UE and a DRB ID or an E-RAB ID corresponding to the UE.

S306. The macro base station sends a data packet to the TP.

The data packet is generated by using a PDCP PDU of the macro base station.

S307. The TP receives the data packet sent by the macro base station.

S308. The TP acquires a PDCP PDU, which is used as an RLC SDU, in the data packet.

It should be noted that, before being processed at an RLC layer, the PDCP PDU sent from a PDCP layer to the RLC layer is an RLC SDU at the RLC layer. Because the PDCP PDU at the PDCP layer, that is, the RLC SDU at the RLC layer, sent by the macro base station is not processed at an RLC layer of the TP, a sequence number of a packet header of the PDCP PDU is the same as a sequence number of a packet header of the RLC SDU, and it may be identified, according to the sequence numbers, whether the PDCP PDU and the RLC SDU carry same data information.

S309. The TP sends data generated by using the RLC SDU to a UE.

Exemplarily, if the RLC SDU is relatively large, the TP segments the RLC SDU into three data packets, and the three data packets are marked as an RLC PDU 1, an RLC PDU 2, and an RLC PDU 3, and are sent to the UE, so that the UE feeds back a second status report to the TP according to whether the RLC PDU 1, the RLC PDU 2, and the RLC PDU 3 are successfully transmitted.

S310. The TP receives a second status report sent by the UE.

Exemplarily, the second status report is used to indicate whether the UE successfully receives the data generated by using the RLC SDU. If second status reports, which are about the RLC PDU 1, the RLC PDU 2, and the RLC PDU 3 of the RLC SDU, returned by the UE and received by the TP are all acknowledgement (ACK), it is determined that the RLC SDU is successfully sent; otherwise, the RLC SDU is not successfully sent. A maximum number of re-transmissions may be set for the TP. For example, the maximum number of re-transmissions is set to 5; if the RLC PDU 2 is transmitted 5 times, and each second status report fed back is negative acknowledgement (NACK), it is determined that the RLC PDU 2 is not successfully sent, and it is further determined that the RLC SDU from which the RLC PDU 2 is obtained by segmentation is not successfully sent.

Further, the TP may determine, according to whether the RLC PDU is successfully sent, whether the received RLC SDU is successfully sent, and may inform the macro base station according to whether the RLC SDU is successfully sent, so that the macro base station determines, according to whether the RLC SDU is successfully sent, whether the PDCP PDU is successfully sent.

S311. The TP sends a first status report to the macro base station.

It should be pointed out that the first status report is used to indicate whether the PDCP PDU is successfully sent, where: if the second status report indicates that the UE successfully receives the data generated by using the RLC SDU, the first status report indicates that the PDCP PDU is successfully sent; if the second status report indicates that the UE does not successfully receive the data generated by using the RLC SDU, the first status report indicates that the PDCP PDU is not successfully sent.

It should be noted that the data transmission control method provided in this embodiment is a method in which a TP and a macro base station are in a mode in which sending is successful by default, that is, a mode in which the macro base station determines that sending is successful if the macro base station does not receive a first status report within a first preset time. If the TP determines that an RLC PDU is successfully sent, and determines that an RLC SDU from which the RLC PDU is obtained by segmentation and concatenation is successfully sent, the TP does not send a first status report to the macro base station; if the TP determines that an RLC PDU is not successfully sent, and determines that an RLC SDU from which the RLC PDU is obtained by segmentation and concatenation is not successfully sent, the TP sends a first status report to the macro base station.

The first status report includes only information used to identify the RLC SDU. Alternatively, in addition to information used to identify the RLC SDU, the first status report further includes a UE ID and/or an RB ID of the user equipment, where the information used to identify the RLC SDU includes an identifier of the RLC SDU, where the identifier is an identifier of a packet header of the RLC SDU, or the identifier is a sequence number of the RLC SDU that is agreed on with the base station.

Exemplarily, if the information used to identify the RLC SDU in the first status report includes at least one group of consecutive values, in order to reduce overheads of the status report message, the first status report may be: identifiers of inconsecutive RLC SDUs, an identifier of an RLC SDU having a minimum sequence number or a maximum sequence number in a group of consecutive values, and an offset value, where the offset value indicates the number of consecutive RLC SDUs in the group of consecutive values, or the number of consecutive RLC SDUs minus one.

Exemplarily, when a sequence number of an RLC SDU that is not successfully sent is consecutive to an RLC SDU sequence number in a previous RLC SDU status report sent by the TP, 1 bit is used to indicate continuity of the sequence number of the RLC SDU. That is, if the sequence number previously sent by the TP is 2, and a currently sent sequence number is 3, because 11 occupies two bits, a commonly known rule may be preset, and a specific bit in the status report is set to 1 to identify that the currently sent sequence number and the previously sent sequence number are consecutive.

It should be pointed out that, if a first status report sent by the TP at a time carries sequence numbers of multiple first SDUs, when the sequence numbers are consecutive, an offset value may be set in the first status report, and a maximum or minimum RLC SDU sequence number may be selected from the consecutive numbers. For example, the offset value is the total number of consecutive RLC SDUs minus one. If ten sequence numbers, namely, 100 to 109, need to be sent in the first status report, the offset value may be set to 9, and the first status report carries only the minimum value 100 and the offset value 9, so that the macro base station uses 100 as a base number and increments the base number 9 times, where the base number is incremented by 1 each time, to obtain the ten sequence numbers. This is merely an example, and the embodiment of the present disclosure is not limited thereto.

Further, in order to enable the macro base station to determine that the PDCP PDU is not successfully sent, the TP may set that: after the TP receives time configured by the OAM or by the macro base station, the TP maintains a first timer for each RLC SDU of a DRB ID or an E-RAB ID of a corresponding UE, where duration of the first timer is a first timer length, and the first timer functions as follows: within the first timer length, if the RLC SDU is not successfully sent, a first status report is sent to the macro base station, where the message includes an identifier of the RLC SDU, and if the RLC SDU is successfully sent, no first status report is sent.

It should be pointed out that the macro base station may receive the first timer length sent by the OAM and send the first timer length to the TP; a method of configuration performed after the macro base station and the TP receive the first timer length is described in the foregoing embodiment, and details are not described herein again.

Likewise, the macro base station maintains a first timer for each PDCP PDU corresponding to the RLC SDU, where time of the first timer is an updated first timer length that is greater than or equal to the foregoing configured first timer length. The updated first timer length may be a sum of the foregoing configured time and an offset value, where the offset value is greater than or equal to twice a backhaul link delay between the macro base station and the TP, mainly considering impact of the backhaul link delay on transmission of a data packet. In this way, if the first status report is received within the updated first timer length, it may be determined that the PDCP PDU is not successfully sent; if the identifier of the RLC SDU corresponding to the PDCP PDU is not received within the first timer length, it is determined that the PDCP PDU is successfully sent.

S312. The macro base station receives the first status report sent by the TP.

It should be noted that, if the TP does not receive the second status report sent by the UE when the first timer expires, the TP sends a first status report to the macro base station, where the first status report indicates that the RLC SDU is not successfully sent, and the second status report is used to indicate whether the UE successfully receives the data generated by using the RLC SDU; or before the first timer expires, the TP receives the second status report sent by the UE, where the second status report is used to indicate whether the UE successfully receives the data generated by using the RLC SDU, and if the second status report indicates that the UE does not successfully receive the data generated by using the RLC SDU, the TP sends a first status report to the macro base station, where the first status report indicates that the RLC SDU is not successfully sent, or if the second status report indicates that the UE successfully receives the data generated by using the RLC SDU, the TP does not send a first status report to the macro base station. The macro base station may receive the foregoing first status report sent by the TP.

S313. The macro base station determines, according to the first status report, whether the PDCP PDU is successfully sent.

Exemplarily, if the macro base station receives, within the updated first timer length, a first status report sent by the TP, and if the first status report carries an identifier of a PDCP PDU, it is determined that the PDCP PDU is not successfully sent; if the macro base station does not receive, within an updated first timer length for a PDCP PDU, a first status report sent by the TP, it is determined that the PDCP PDU is successfully sent.

It should be pointed out that, if the macro base station determines, according to the received first status report, that the PDCP PDU is not successfully sent, the macro base station may choose to transmit, to the UE, the PDCP PDU that is not successfully transmitted and a PDCP PDU to be sent next time through a Uu interface between the macro base station and the UE but not through the TP. Alternatively, the macro base station may reselect a new TP, and enable the new TP to establish a connection to the UE and perform data transmission: sending an activation instruction to the new TP, where the message includes a UE ID, a DRB ID or an E-RAB ID corresponding to Qos of a service requested by the UE, and RLC layer configuration information of the TP. The new TP receives the activation instruction of the macro base station, and performs configuration according to a configuration requirement.

Further, if the UE enters a coverage area of another macro base station, the current macro base station generates, according to a case in which the PDCP PDU is successfully transmitted, a sequence number report and/or data of the PDCP PDU, sends the report and/or the data to the target macro base station, and hands over the UE to the new macro base station, so that the new macro base station supports a service required by the UE.

In the data transmission control method provided in this embodiment of the present disclosure, a TP receives a data packet sent by a macro base station, where the data packet is generated by using a PDCP PDU of the macro base station, and the TP acquires the PDCP PDU, which is used as an RLC SDU, in the data packet, and sends data generated by using the RLC SDU to a user equipment. In this way, to interact with a PDCP layer of the TP, the macro base station only needs to be provided with an RLC layer, and it is further ensured that for data in acknowledged or unacknowledged mode agreed on by the macro base station and the TP, data transmission requirements are met according to different mode requirements. In addition, because the macro base station and the TP perform coordinated multi-point data transmission with the user equipment, a throughput of the user equipment is improved.

Figure 6:
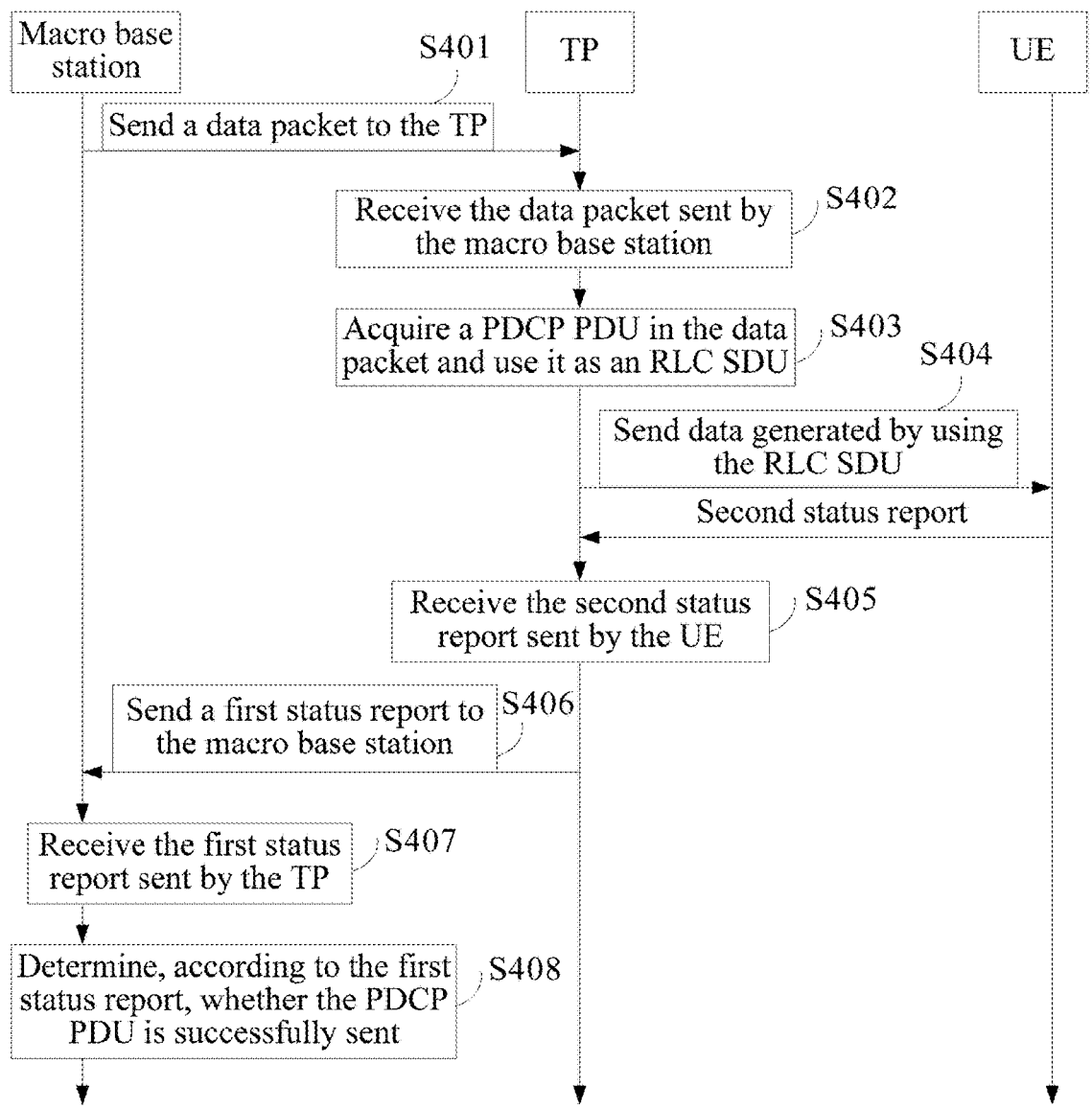
FIG. 6 is a schematic flowchart of a data transmission method according to another embodiment of the present disclosure.

A data transmission method provided by another embodiment of the present disclosure is shown in FIG. 6. This embodiment is described by using an example in which a first timer is not maintained, a second timer is maintained, a base station is a macro base station, and a radio communication node is a TP, but the embodiment of the present disclosure is not limited thereto. Steps of the method include:

S401. A macro base station sends a data packet to a TP.

The data packet is generated by using a PDCP PDU of the macro base station.

S402. The TP receives the data packet sent by the macro base station.

S403. The TP acquires the PDCP PDU, which is used as an RLC SDU, in the data packet.

It should be noted that, before being processed at an RLC layer, the PDCP PDU sent from a PDCP layer to the RLC layer is an RLC SDU at the RLC layer. Because the PDCP PDU at the PDCP layer, that is, the RLC SDU at the RLC layer, sent by the macro base station is not processed at an RLC layer of the TP, a sequence number of a packet header of the PDCP PDU is the same as a sequence number of a packet header of the RLC SDU, and it may be identified, according to the sequence numbers, whether the PDCP PDU and the RLC SDU carry same data information.

S404. The TP sends data generated by using the RLC SDU to a UE.

S405. The TP receives a second status report sent by the UE.

It should be noted that the second status report is used to indicate whether the UE successfully receives the data generated by using the RLC SDU.

Exemplarily, if second status reports, which are about an RLC PDU 1, an RLC PDU 2, and an RLC PDU 3 of the RLC SDU, returned by the UE and received by the TP are all ACK, it is determined that the RLC SDU is successfully sent; otherwise, the RLC SDU is not successfully sent. Further, the TP may determine, according to whether the RLC PDU is successfully sent, whether the received RLC SDU is successfully sent, and may inform the macro base station according to whether the RLC SDU is successfully sent, so that the macro base station determines, according to whether the RLC SDU is successfully sent, whether the PDCP PDU is successfully sent.

S406. The TP sends a first status report to the macro base station.

It should be noted that the data transmission method provided in this embodiment is a method in which the TP and the macro base station are in unacknowledged mode, that is, the macro base station determines, according to content of the first status report, whether the PDCP PDU is successfully sent.

Further, the first status report is used to indicate whether the PDCP PDU is successfully sent, where: if the second status report indicates that the UE successfully receives the data generated by using the RLC SDU, the first status report indicates that the PDCP PDU is successfully sent; if the second status report indicates that the UE does not successfully receive the data generated by using the RLC SDU, the first status report indicates that the PDCP PDU is not successfully sent.

Exemplarily, the first status report carries information used to identify the RLC SDU, where the information used to identify the RLC SDU includes an identifier of the RLC SDU, where the identifier is an identifier of a packet header of the RLC SDU, or the identifier is a sequence number of the RLC SDU that is agreed on with the base station. Still further, the first status report further carries a UE ID and/or a bearer identity RB ID of the UE.

Based on the content carried in the foregoing identifier, the information used to identify the RLC SDU further includes an offset value, where the offset value is used to determine whether a PDCP PDU corresponding to at least one RLC SDU corresponding to the offset value is successfully sent; or the information used to identify the RLC SDU further includes a bitmap, where the bitmap is used to determine whether a PDCP PDU corresponding to at least one RLC SDU consecutive to the RLC SDU is successfully sent, where the number of bits of the bitmap is the same as the number of the at least one RLC SDU.

S407. The macro base station receives the first status report sent by the TP.

Exemplarily, if the macro base station receives the first status report sent by the TP, and the first status report indicates that the RLC SDU is successfully sent, it is determined that the PDCP PDU is successfully sent; if the macro base station receives the first status report sent by the TP, and the first status report indicates that the RLC SDU is not successfully sent, it is determined that the PDCP PDU is not successfully sent.

Exemplarily, if the first status report includes identifiers of at least two RLC SDUs, the identifiers of the RLC SDUs include an identifier of a RLC SDU having a minimum sequence number that is successfully sent or not successfully sent and a bit string. Each bit in the bit string indicates a status of an RLC SDU after the RLC SDU having a minimum sequence number that is successfully sent or not successfully sent, and the status indicates whether the RLC SDU is successfully sent. For example, the identifiers of the RLC SDUs in the status report are 5, 1, 0, 0, 1, 0 . . . . If the status report indicates that an identifier of the first RLC SDU is an identifier of a successfully sent RLC SDU, 5 indicates that an RLC SDU whose identifier is 5 is successfully sent, and 10010 indicates that RLC SDUs whose identifiers are 6 and 9 are successfully sent, and RLC SDUs whose identifiers are 7, 8, and 10 are not successfully sent.

S408. The macro base station determines, according to the first status report, whether the PDCP PDU is successfully sent.

In the data transmission control method provided in this embodiment of the present disclosure, a TP receives a data packet sent by a macro base station, where the data packet is generated by using a PDCP PDU of the macro base station, and the TP acquires the PDCP PDU, which is used as an RLC SDU, in the data packet, and sends data generated by using the RLC SDU to a user equipment. In this way, to interact with a PDCP layer of the TP, the macro base station only needs to be provided with an RLC layer, and it is further ensured that for data in acknowledged or unacknowledged mode agreed on by the macro base station and the TP, data transmission requirements are met according to different mode requirements. In addition, because the macro base station and the TP perform coordinated multi-point data transmission with the user equipment, a throughput of the user equipment is improved.

Figure 7:
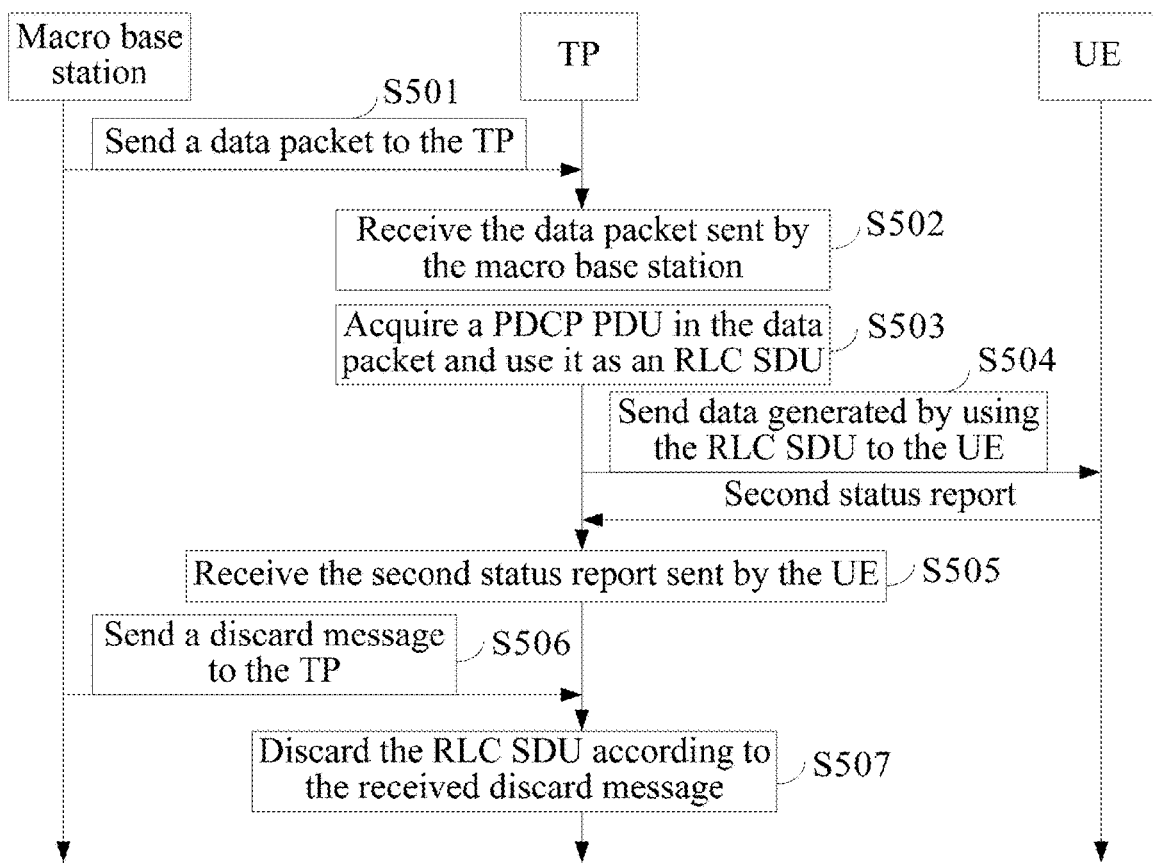
FIG. 7 is a schematic flowchart of a data transmission method according to still another embodiment of the present disclosure.

A data transmission method provided by another embodiment of the present disclosure is shown in FIG. 7. This embodiment is described by using an example in which a base station is a macro base station and a radio communication node is a TP in acknowledged mode or unacknowledged mode, but the embodiment of the present disclosure is not limited thereto. Steps of the method include:

S501. A macro base station sends a data packet to a TP.

The data packet is generated by using a PDCP PDU of the macro base station.

S502. The TP receives the data packet sent by the macro base station.

S503. The TP acquires a PDCP PDU, which is used as an RLC SDU, in the data packet.

S504. The TP sends data generated by using the RLC SDU to a UE.

S505. The TP receives a second status report sent by the UE.

It should be noted that the second status report is used to indicate whether the UE successfully receives the data generated by using the RLC SDU.

Further, a transmission manner in step S501 to step S505 is the same as that in the embodiments described above, and both a processing method and transmission content are the same as those in the embodiments described above. Details are not described herein again.

S506. The macro base station sends a discard message to the TP.

Exemplarily, the discard message instructs to discard the RLC SDU corresponding to the PDCP PDU. The discard message carries information used to identify the RLC SDU, where the information used to identify the RLC SDU includes an identifier of the RLC SDU, where the identifier is an identifier of a packet header of the RLC SDU, or the identifier is a sequence number of the RLC SDU agreed on with the base station.

It should be noted that a PDCP of the macro base station maintains a timeout timer for a PDCP SDU corresponding to each PDCP PDU, where duration of the timeout timer is a second preset timer length, for example, 10 seconds, and if the duration of 10 seconds expires, the macro base station sends a discard message to the TP. A second timer length is set for a DRB ID or an E-RAB ID of each UE.

Further, the discard message may include the identifier of the RLC SDU, where the identifier of the RLC SDU may be a sequence number of a packet header of a PDCP PDU sent by the macro base station to the TP, and may also be a preset code of the RLC SDU, commonly known by the macro base station and the TP. For example, an RLC SDU 1, an RLC SDU 2, an RLC SDU 3, an RLC SDU 4, and an RLC SDU 5 correspond to a PDCP PDU 1, a PDCP PDU 3, a PDCP PDU 5, a PDCP PDU 7, and a PDCP PDU 9, and that the PDCP PDU 3 is successfully sent may be determined according to that the RLC SDU 2 is successfully sent. When the discard message includes at least one group of consecutive values, the discard message may further include a UE ID, and a DRB ID or an E-RAB ID of the UE. In order to reduce overheads of the discard message, content of the discard message may be: identifiers of inconsecutive RLC SDUs, an identifier of an RLC SDU having a minimum sequence number or a maximum sequence number in a group of consecutive values, and an offset value, where the offset value indicates the number of consecutive RLC SDUs in the group of consecutive values. It should be pointed out that the identifier carried in the discard message may be any identifier carried in the first status report in the foregoing embodiment, and details are not described herein again.

S507. The TP receives the discard message sent by the macro base station.

Exemplarily, if the TP receives the discard message, the TP discards the corresponding RLC SDU according to the discard message.

S508. The TP discards the RLC SDU according to the received discard message.

Figure 8:
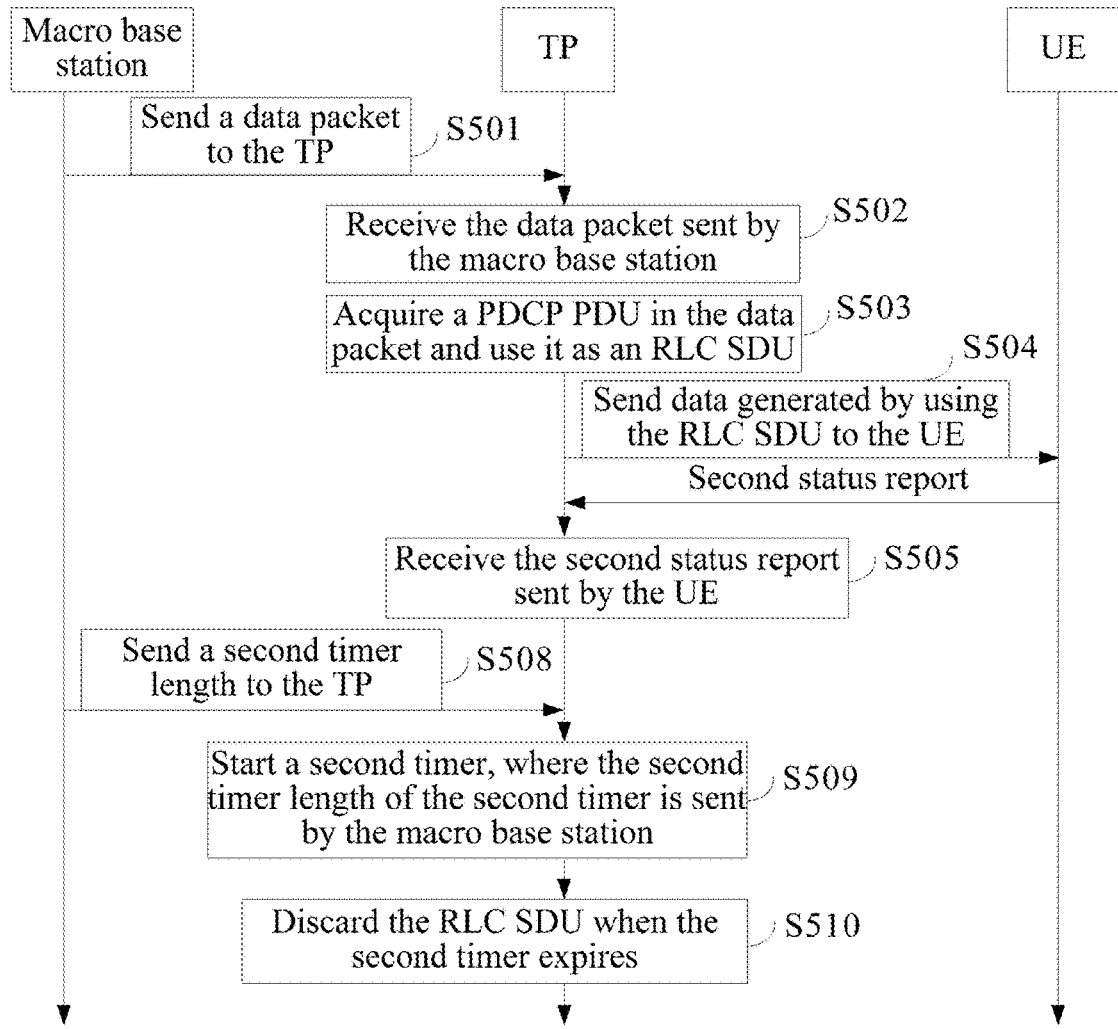
FIG. 8 is a schematic flowchart of a data transmission method according to yet another embodiment of the present disclosure.

It should be pointed out that as shown in FIG. 8, after step S504, step S508 may further be performed, and one of step S508 and step S505 is selected to be performed.

S508. The macro base station sends a second timer length to the TP.

S509. The TP starts a second timer, where the second timer length of the second timer is sent by the macro base station.

Exemplarily, the macro base station sends the second timer length to the TP. The second timer length is time of the timeout timer of the PDCP SDU corresponding to the PDCP PDU.

If the TP maintains the second timer, a second timer length may be set for an RLC SDU of a DRB ID or an E-RAB ID of each UE. After the second timer expires, the TP discards the corresponding RLC SDU.

S510. The TP discards the RLC SDU when the second timer expires.

In the data transmission control method provided in this embodiment of the present disclosure, the TP discards the RLC SDU, thereby saving space, in the TP, for temporarily storing RLC SDUs.

In the data transmission control method provided in this embodiment of the present disclosure, a TP receives a data packet sent by a macro base station, where the data packet is generated by using a PDCP PDU of the macro base station, and the TP acquires the PDCP PDU, which is used as an RLC SDU, in the data packet, and sends data generated by using the RLC SDU to a user equipment. In this way, to interact with a PDCP layer of the TP, the macro base station only needs to be provided with an RLC layer, and it is further ensured that for data in acknowledged or unacknowledged mode agreed on by the macro base station and the TP, data transmission requirements are met according to different mode requirements. In addition, because the macro base station and the TP perform coordinated multi-point data transmission with the user equipment, a throughput of the user equipment is improved.

Figure 9:
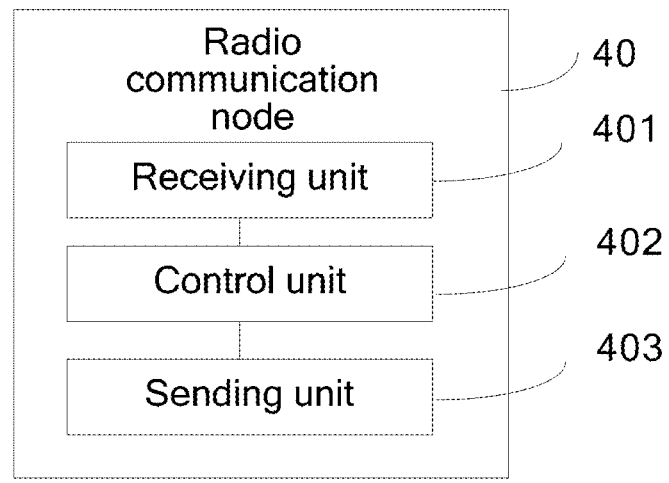
FIG. 9 is a schematic structural diagram of a radio communication node according to an embodiment of the present disclosure.

As shown in FIG. 9, a radio communication node 40 provided in an embodiment of the present disclosure includes:

a receiving unit 401, configured to receive a data packet sent by a base station 50, where the data packet is generated by using a PDCP PDU of the base station 50;

a control unit 402, configured to acquire the PDCP PDU, which is used as an RLC SDU, in the data packet, which is received by the receiving unit 401; and a sending unit 403, configured to send data generated by the control unit 402 by using the RLC SDU to a UE 60.

Further, the receiving unit 401 is further configured to receive a second status report sent by the UE 60, where the second status report is used to indicate whether the UE 60 successfully receives the data generated by using the RLC SDU; and the sending unit 403 is further configured to send a first status report to the base station 50, where the first status report is used to indicate whether the PDCP PDU is successfully sent, where: if the second status report received by the receiving unit 401 indicates that the UE 60 successfully receives the data generated by using the RLC SDU, the first status report indicates that the PDCP PDU is successfully sent; if the second status report received by the receiving unit 401 indicates that the UE 60 does not successfully receive the data generated by using the RLC SDU, the first status report indicates that the PDCP PDU is not successfully sent.

It should be noted that the sending unit 403 is further configured to send the first status report to the base station 50 according to a preset period;

or if the receiving unit 401 receives a request message sent by the base station 50, where the request message is used to request the radio communication node to send the first status report to the base station 50, the sending unit 403 sends the first status report to the base station 50.

The receiving unit 401 is further configured to receive a discard message sent by the base station 50, where the discard message instructs to discard the RLC SDU corresponding to the PDCP PDU; and the control unit 402 is further configured to discard the RLC SDU according to the discard message received by the receiving unit 401.

Figure 10:
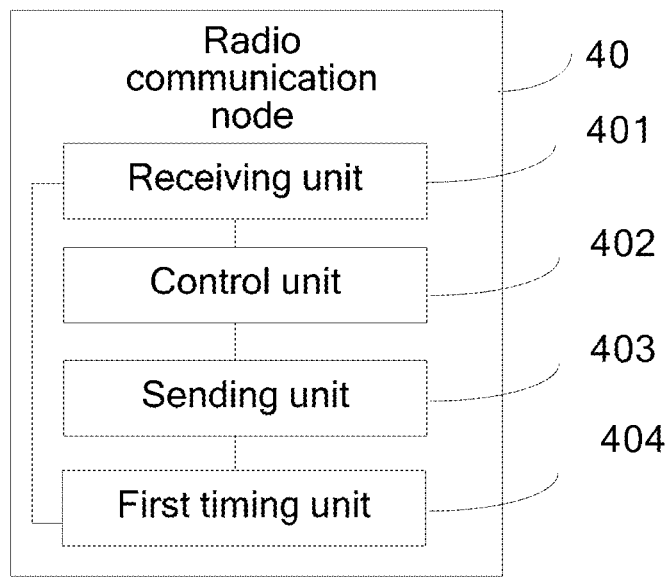
FIG. 10 is a schematic structural diagram of a radio communication node according to another embodiment of the present disclosure.

Further, as shown in FIG. 10, the radio communication node 40 further includes:

a first timing unit 404, configured to start a first timer, where a first timer length of the first timer is sent by the base station 50 or operation, administration and maintenance OAM.

Exemplarily, if the receiving unit 401 does not receive a second status report sent by the UE 60 when the first timer started by the first timing unit 404 expires, the sending unit 403 sends a first status report to the base station 50, where the first status report indicates that the RLC SDU is not successfully sent, and the second status report is used to indicate whether the UE 60 successfully receives the data generated by using the RLC SDU; or before the first timer started by the first timing unit 404 expires, the receiving unit 401 receives a second status report sent by the UE 60, where the second status report is used to indicate whether the UE 60 successfully receives the data generated by using the RLC SDU, and if the second status report indicates that the UE 60 does not successfully receive the data generated by using the RLC SDU, the sending unit 403 sends a first status report to the base station 50, where the first status report indicates that the RLC SDU is not successfully sent, or if the second status report indicates that the UE 60 successfully receives the data generated by using the RLC SDU, the sending unit 403 skips sending a first status report to the base station 50.

Figure 11:
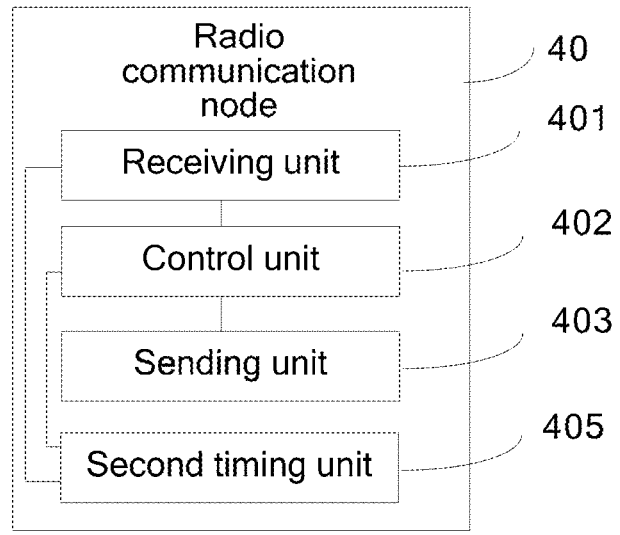
FIG. 11 is a schematic structural diagram of a radio communication node according to still another embodiment of the present disclosure.

Further, as shown in FIG. 11, the radio communication node 40 further includes:

a second timing unit 405, configured to start a second timer, where a second timer length of the second timer is sent by the base station 50; and if the second timer expires, the control unit 402 is further configured to discard the RLC SDU.

Figure 12:
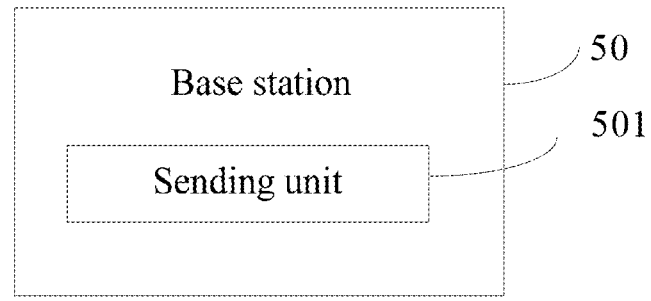
FIG. 12 is a schematic structural diagram of a base station according to an embodiment of the present disclosure.

As shown in FIG. 12, a base station 50 provided in an embodiment of the present disclosure includes:

a sending unit 501, configured to send a data packet to a radio communication node 40, where the data packet is generated by using a PDCP PDU, so that the radio communication node 40 acquires the PDCP PDU, which is used as a Radio Link Control service data unit RLC SDU, in the data packet, and sends data generated by using the RLC SDU to a UE 60.

It should be noted that, in unacknowledged mode or in acknowledged mode, the sending unit 501 is further configured to send a discard message to the radio communication node 40, where the discard message includes an identifier of a first SDU, and is used to instruct the radio communication node 40 to discard the first SDU corresponding to a first PDU.

Figure 13:
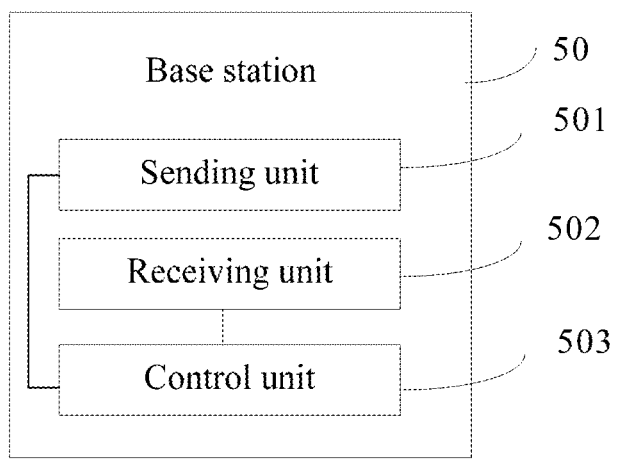
FIG. 13 is a schematic structural diagram of a base station according to another embodiment of the present disclosure.

Further, as shown in FIG. 13, the base station 50 further includes:

a receiving unit 502, configured to receive a first status report sent by the radio communication node 40, where the first status report is used to indicate whether the PDCP PDU is successfully sent, and the first status report is sent by the radio communication node 40 after the radio communication node 40 receives a second status report sent by the UE 60, where: if the second status report indicates that the UE 60 successfully receives the data generated by using the RLC SDU, the first status report indicates that the PDCP PDU is successfully sent; if the second status report indicates that the UE 60 does not successfully receive the data generated by using the RLC SDU, the first status report indicates that the PDCP PDU is not successfully sent; and a control unit 503, configured to determine, according to the first status report received by the receiving unit 502, whether the PDCP PDU is successfully sent.

Further, the receiving unit 502 is further configured to receive a first timer length sent by operation and administration OAM, and enable the sending unit 501 to forward the first timer length to the radio communication node 40;

or the control unit 503 is further configured to generate a first timer length, and enable the sending unit 501 to send the first timer length to the radio communication node 40, where the first timer length is applied to a first timer started by the radio communication node 40.

When the first timer expires, the receiving unit 502 receives a first status report sent by the radio communication node 40, where the first status report indicates that the RLC SDU is not successfully sent, so that the control unit 503 determines that the RLC SDU is not successfully sent;

or before the first timer expires, the receiving unit 502 receives a first status report sent by the radio communication node 40, where the first status report indicates that the RLC SDU is not successfully sent, so that the control unit 503 determines that the RLC SDU is not successfully sent;

or before the first timer expires, the receiving unit 502 does not receive a first status report sent by the radio communication node 40, so that the control unit 503 determines that the RLC SDU is not successfully sent.

Further, the sending unit 501 is further configured to send a request message to the radio communication node 40, where the request message is used to request the radio communication node 40 to send the first status report to the base station.

The sending unit 501 is further configured to send a discard message to the radio communication node 40, where the discard message instructs to discard the RLC SDU corresponding to the PDCP PDU.

The sending unit 501 is further configured to send a second timer length to the radio communication node 40, where the second timer length is applied to a second timer started by the radio communication node 40.

The base station 50 may work by using the method provided in the foregoing embodiment, the working method is the same as the method provided in the embodiment, and details are not described herein again.

For the base station 50 and the radio communication node 40 provided in the embodiments of the present disclosure, the radio communication node 40 receives a data packet sent by the base station 50, where the data packet is generated by using a PDCP PDU of the base station 50, and the radio communication node 40 acquires the PDCP PDU, which is used as an RLC SDU, in the data packet, and sends data generated by using the RLC SDU to a UE 60. In this way, to interact with a PDCP layer of the radio communication node 40, the base station 50 only needs to be provided with an RLC layer, and it is further ensured that for data in acknowledged or unacknowledged mode agreed on by the base station 50 and the radio communication node 40, data transmission requirements are met according to different mode requirements. In addition, because the base station 50 and the radio communication node 40 perform coordinated multi-point data transmission with the UE 60, a throughput of the UE 60 is improved.

Figure 14:
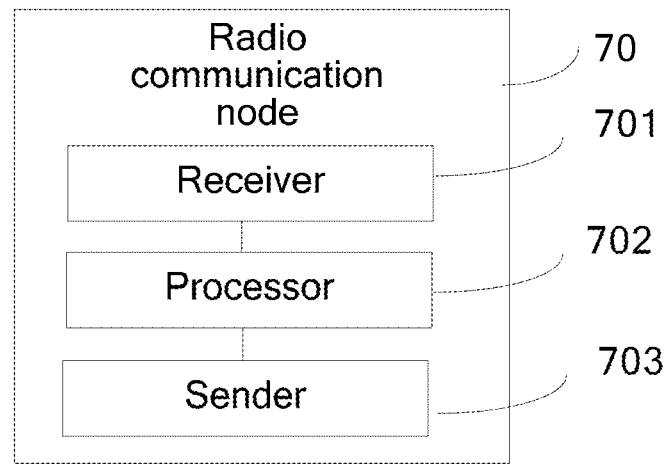
FIG. 14 is a schematic structural diagram of another radio communication node according to an embodiment of the present disclosure.

As shown in FIG. 14, a radio communication node 70 provided in another embodiment of the present disclosure includes:

a receiver 701, configured to receive a data packet sent by a base station 80, where the data packet is generated by using a PDCP PDU of the base station 80;

a processor 702, configured to acquire the PDCP PDU, which is used as an RLC SDU, in the data packet, which is received by the receiver 701; and a sender 703, configured to send data generated by the processor 702 by using the RLC SDU to a UE 60.

In acknowledged mode, the sender 703 is further configured to send a first status report to the base station 80, where the first status report is generated by the processor 702 according to whether an RLC PDU received by the receiver 701 is successfully sent, so that the base station 80 determines, according to the first status report, whether the PDCP PDU is successfully sent.

Further, the receiver 701 is configured to receive a second status report sent by the UE 60, where the second status report is used to indicate whether the UE 60 successfully receives the data generated by using the RLC SDU; and the sender 703 is further configured to send a first status report to the base station 80, where the first status report is used to indicate whether the PDCP PDU is successfully sent, where: if the second status report received by the receiver 701 indicates that the UE 60 successfully receives the data generated by using the RLC SDU, the first status report indicates that the PDCP PDU is successfully sent; if the second status report received by the receiver 701 indicates that the UE 60 does not successfully receive the data generated by using the RLC SDU, the first status report indicates that the PDCP PDU is not successfully sent.

Still further, the processor 702 is further configured to start a first timer, where a first timer length of the first timer is sent by the base station 80 or operation, administration and maintenance OAM.

If the receiver 701 does not receive a second status report sent by the UE 60 when the first timer started by the processor 702 expires, the sender 703 sends a first status report to the base station 80, where the first status report indicates that the RLC SDU is not successfully sent, and the second status report is used to indicate whether the UE 60 successfully receives the data generated by using the RLC SDU;

or before the first timer started by the processor 702 expires, the receiver 701 receives a second status report sent by the UE 60, where the second status report is used to indicate whether the UE 60 successfully receives the data generated by using the RLC SDU, and if the second status report indicates that the UE 60 does not successfully receive the data generated by using the RLC SDU, the sender 703 sends a first status report to the base station 80, where the first status report indicates that the RLC SDU is not successfully sent, or if the second status report indicates that the UE 60 successfully receives the data generated by using the RLC SDU, the sender 703 skips sending a first status report to the base station 80.

Still further, the sender 703 is further configured to send the first status report to the base station 80 according to a preset period;

or if the receiver 701 receives a request message sent by the base station 80, where the request message is used to request the radio communication node to send the first status report to the base station 80, the sender 703 sends the first status report to the base station 80.

Exemplarily, the receiver 701 is further configured to receive a discard message sent by the base station 80, where the discard message instructs to discard the RLC SDU corresponding to the PDCP PDU; and the processor 702 is further configured to discard the RLC SDU according to the discard message received by the receiver 701.

Alternatively, the processor 702 is further configured to start a second timer, where a second timer length of the second timer is sent by the base station 80; and if the second timer expires, the processor 702 is further configured to discard the RLC SDU.

The radio communication node 70 may work by using the method provided in the foregoing embodiment, the working method is the same as the method provided in the embodiment, and details are not described herein again.

Figure 15:
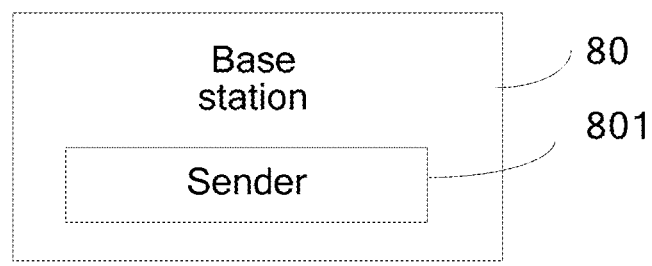
FIG. 15 is a schematic structural diagram of another base station according to an embodiment of the present disclosure.

As shown in FIG. 15, a base station 80 provided in another embodiment of the present disclosure includes:

a sender 801, configured to send a data packet to a radio communication node 70, where the data packet is generated by using a PDCP data unit PDU, so that the radio communication node 70 acquires the PDCP PDU, which is used as a Radio Link Control service data unit RLC SDU, in the data packet, and sends data generated by using the RLC SDU to a UE 60.

Figure 16:
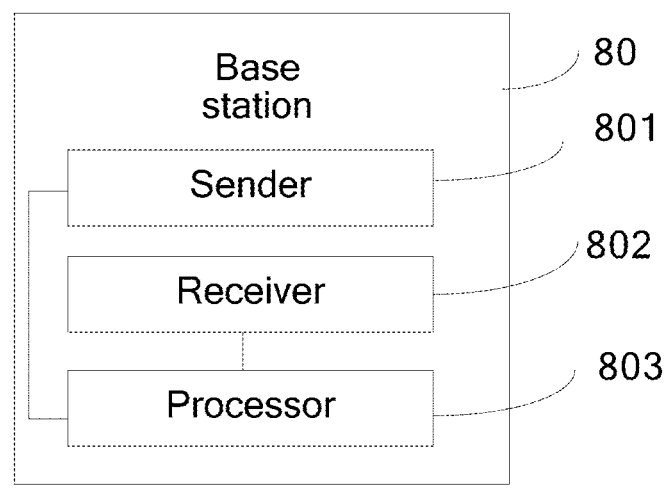
FIG. 16 is a schematic structural diagram of a base station according to another embodiment of the present disclosure.

Further, as shown in FIG. 16, the base station 80 further includes:

a receiver 802, configured to receive a first status report sent by the radio communication node 70, where the first status report is used to indicate whether the PDCP PDU is successfully sent, and the first status report is sent by the radio communication node 70 after the radio communication node 70 receives a second status report sent by the UE 60, where: if the second status report indicates that the UE 60 successfully receives the data generated by using the RLC SDU, the first status report indicates that the PDCP PDU is successfully sent; if the second status report indicates that the UE 60 does not successfully receive the data generated by using the RLC SDU, the first status report indicates that the PDCP PDU is not successfully sent; and a processor 803, configured to determine, according to the first status report received by the receiver 802, whether the PDCP PDU is successfully sent.

Exemplarily, the receiver 802 is configured to receive a first timer length sent by operation and administration OAM, and enable the sender 801 to forward the first timer length to the radio communication node 70; or the processor 803 is configured to generate a first timer length, and enable the sender 801 to send the first timer length to the radio communication node 70, where the first timer length is applied to a first timer started by the radio communication node 70.

Further, when the first timer expires, the receiver 802 receives a first status report sent by the radio communication node 70, where the first status report indicates that the RLC SDU is not successfully sent, so that the processor 803 determines that the RLC SDU is not successfully sent; or before the first timer expires, the receiver 802 receives a first status report sent by the radio communication node 70, where the first status report indicates that the RLC SDU is not successfully sent, so that the processor 803 determines that the RLC SDU is not successfully sent; or before the first timer expires, the receiver 802 does not receive a first status report sent by the radio communication node 70, so that the processor 803 determines that the RLC SDU is not successfully sent.

Still further, the sender 801 is further configured to send a request message to the radio communication node 70, where the request message is used to request the radio communication node 70 to send the first status report to the base station 80.

It should be pointed out that the sender 801 is further configured to send a discard message to the radio communication node 70, where the discard message instructs to discard the RLC SDU corresponding to the PDCP PDU.

Alternatively, the sender 801 is further configured to send a second timer length to the radio communication node 70, where the second timer length is applied to a second timer started by the radio communication node 70.

The base station 80 may work by using the method provided in the foregoing embodiment, the working method is the same as the method provided in the embodiment, and details are not described herein again.

For the base station 80 and the radio communication node 70 provided in the embodiments of the present disclosure, the radio communication node 70 receives a data packet sent by the base station 80, where the data packet is generated by using a PDCP PDU of the base station 80, and the radio communication node 70 acquires the PDCP PDU, which is used as an RLC SDU, in the data packet, and sends data generated by using the RLC SDU to a user equipment. In this way, to interact with a PDCP layer of the radio communication node 70, the base station 80 only needs to be provided with an RLC layer, and it is further ensured that for data in acknowledged or unacknowledged mode agreed on by the base station 80 and the radio communication node 70, data transmission requirements are met according to different mode requirements. In addition, because the base station 80 and the radio communication node 70 perform coordinated multi-point data transmission with the user equipment, a throughput of the user equipment is improved.

Figure 17:
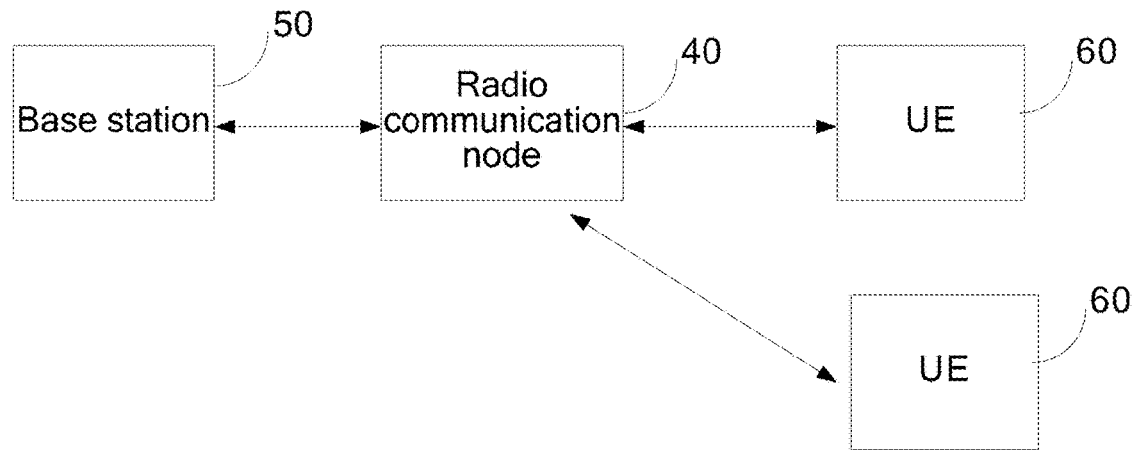
FIG. 17 is a schematic structural diagram of a system according to an embodiment of the present disclosure.

As shown in FIG. 17, a system provided in an embodiment of the present disclosure includes:

the base station 50 in the foregoing embodiment;

the radio communication node 40 in the foregoing embodiment; and a UE 60, configured to receive data that is sent by the radio communication node 40 and is generated by using an RLC SDU.

It should be noted that the foregoing base station 50 and radio communication node 40 can perform the foregoing corresponding method embodiments, and for specific structures of the base station 50 and radio communication node 40, reference may be made to the foregoing embodiment of the base station 50 and the foregoing embodiment of the radio communication node 40. The base station 50 and the radio communication node 40 may be used to perform the steps of the foregoing method embodiments, and for specific application in the steps, reference may be made to the foregoing method embodiments. The specific structures of the base station 50 and the radio communication node 40 are the same as the structures of the base station and the terminal provided in the foregoing embodiments, and details are not described herein again.

The system provided in this embodiment of the present disclosure includes a base station, a radio communication node, and a UE. The radio communication node receives a data packet sent by the base station, where the data packet is generated by using a PDCP PDU of the base station, and the radio communication node acquires the PDCP PDU, which is used as an RLC SDU, in the data packet, and sends data generated by using the RLC SDU to the user equipment. In this way, to interact with a PDCP layer of the radio communication node, the base station only needs to be provided with an RLC layer, and it is further ensured that for data in acknowledged or unacknowledged mode agreed on by the base station and the radio communication node, data transmission requirements are met according to different mode requirements. In addition, because the base station and the radio communication node perform coordinated multi-point data transmission with the user equipment, a throughput of the user equipment is improved.

Figure 18:
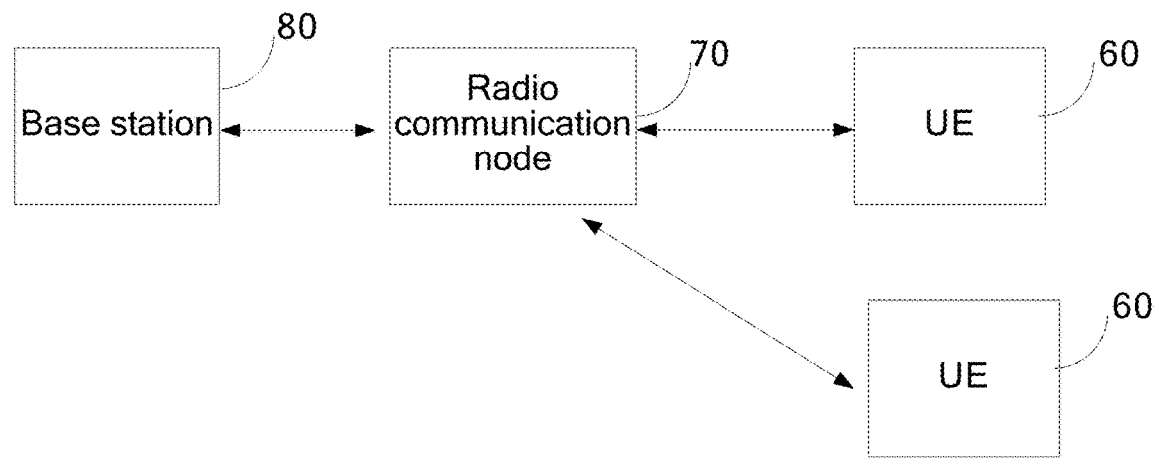
FIG. 18 is a schematic structural diagram of a system according to another embodiment of the present disclosure.

As shown in FIG. 18, a system provided in an embodiment of the present disclosure includes:

the base station 80 in the foregoing embodiment;

the radio communication node 70 in the foregoing embodiment; and a UE 60, configured to receive data that is sent by the radio communication node 70 and is generated by using an RLC SDU.

It should be noted that the foregoing base station 80 and radio communication node 70 can perform the foregoing corresponding method embodiments, and for specific structures of the base station 80 and radio communication node 70, reference may be made to the foregoing embodiment of the base station 80 and the foregoing embodiment of the radio communication node 70. The base station 80 and the radio communication node 70 may be used to perform the steps of the foregoing method embodiments, and for specific application in the steps, reference may be made to the foregoing method embodiments. The specific structures of the base station 80 and the radio communication node 70 are the same as the structures of the base station and the terminal provided in the foregoing embodiments, and details are not described herein again.

The system provided in this embodiment of the present disclosure includes a base station, a radio communication node, and a UE. The radio communication node receives a data packet sent by the base station, where the data packet is generated by using a PDCP PDU of the base station, and the radio communication node acquires the PDCP PDU, which is used as RLC SDU, in the data packet, and sends data generated by using the RLC SDU to the user equipment. In this way, to interact with a PDCP layer of the radio communication node, the base station only needs to be provided with an RLC layer, and it is further ensured that for data in acknowledged or unacknowledged mode agreed on by the base station and the radio communication node, data transmission requirements are met according to different mode requirements. In addition, because the base station and the radio communication node perform coordinated multi-point data transmission with the user equipment, a throughput of the user equipment is improved.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission control method, comprising:
receiving, by a radio communication node, a first data packet of a transport protocol layer from a base station, wherein a Packet Data Convergence Protocol protocol data unit (PDCP PDU) of the base station is encapsulated in the first data packet;
acquiring, by the radio communication node, the PDCP PDU, encapsulated in the first data packet and configured for use as a Radio Link Control service data unit (RLC SDU);
generating, by the radio communication node, data from the RLC SDU, wherein the data includes at least one Radio Link Control packet data unit (RLC PDU) and the PDCP PDU is encapsulated in the at least one RLC PDU;
sending, by the radio communication node, the at least one RLC PDU to a user equipment (UE);
receiving, by the radio communication node, a second status report from the UE;
sending, by the radio communication node, a first status report to the base station for indicating that the PDCP PDU is successfully sent, wherein the second status report indicates the UE successfully receives the at least one RLC PDU; and
establishing, by the radio communication node, a user plane connection between the radio communication node and the UE.

2. The method according to claim 1, wherein:
the first status report carries information for identifying the RLC SDU.

3. The method according to claim 2, wherein:
the information for identifying the RLC SDU comprises an identifier of the RLC SDU, wherein the identifier comprises a maximum sequence number of the RLC SDU successfully delivered in RLC SDUs in sequence to the UE.

4. The method according to claim 1, wherein:
the first status report is transmitted through a unique transmission tunnel at a transport protocol layer for each bearer of the UE between the radio communication node and the base station.

5. The method according to claim 1, wherein:
the first status report is encapsulated in a second data packet of a transport protocol layer, and wherein at least one of the first and second data packets is in accordance with a GPRS tunnelling protocol for a user plane (GTP-U).

6. The method according to claim 1, wherein:
the first status report is encapsulated in a second data packet of a transport protocol layer, and wherein at least one of the first and second data packets includes a type indication packet header for indicating a type of data transmitted in the data packet, wherein the type of data comprises a PDCP PDU type or a first status report type.

7. The method according to claim 1, wherein after acquiring, by the radio communication node, the PDCP PDU, the method further comprises:
receiving discard information sent by the base station for instructing the radio communications node to discard the RLC SDU corresponding to the PDCP PDU; and discarding the RLC SDU according to the received discard information.

8. The method according to claim 1, further comprising:
receiving, by the radio communication node, request information for triggering a report of the first status report.

9. A radio communication node, comprising:
a receiver, configured to receive a first data packet of a transport protocol layer from a base station, wherein a Packet Data Convergence Protocol protocol data unit (PDCP PDU) of the base station is encapsulated in the data packet;
a processor, configured to acquire the PDCP PDU encapsulated in the received first data packet and configured for use as a Radio Link Control service data unit (RLC SDU) and generate data from the RLC SDU, wherein the data includes at least one Radio Link Control packet data unit (RLC PDU) and the PDCP PDU is encapsulated in the at least one RLC PDU;
a transmitter, configured to send the at least one RLC PDU to a user equipment (UE);
wherein the receiver is further configured to receive a second status report from the UE;
wherein the transmitter is further configured to send a first status report to the base station for indicating the PDCP PDU is successfully sent, wherein the second status report indicates the UE successfully receives the at least one RLC PDU; and
wherein the radio communications node is configured to establish a user plane connection between the radio communication node and the UE.

10. The radio communication node according to claim 9, wherein:
the first status report is configured to carry information for identifying the RLC SDU.

11. The radio communication node according to claim 10, wherein:
the information for identifying the RLC SDU comprises an identifier of the RLC SDU, wherein the identifier comprises a maximum sequence number of the RLC SDU successfully delivered in RLC SDUs in sequence to the UE.

12. The radio communication node according to claim 9, wherein the transmitter is configured to:
transmit the first status report through a unique transmission tunnel at a transport protocol layer for each bearer of the UE between the radio communication node and the base station.

13. The radio communication node according to claim 9, wherein:
the first status report is encapsulated in a second data packet of a transport protocol layer, and wherein at least one of the first and second data packets is in accordance with a GPRS tunnelling protocol for a user plane (GTP-U).

14. The radio communication node according to claim 9, wherein:
the first status report is encapsulated in a second data packet of a transport protocol layer, and wherein the at least one of the first and second data packets includes a type indication packet header for indicating a type of data transmitted in the data packet, wherein the type of data comprises a PDCP PDU type or a first status report type.

15. The radio communication node according to claim 9, wherein:
- the receiver is further configured to receive discard information sent by the base station for instructing the radio communications node to discard the RLC SDU corresponding to the PDCP PDU; and
- the processor is further configured to discard the RLC SDU according to the discard information received by the receiver.

16. The radio communication node according to claim 9, wherein:
- the receiver is further configured to receive request information for triggering a report of the first status report.

\* \* \* \* \*